(12) United States Patent
David et al.

(10) Patent No.: US 8,200,196 B2
(45) Date of Patent: Jun. 12, 2012

(54) METHOD AND A SYSTEM FOR ENABLING MULTIMEDIA RING-BACK-WITHIN THE CONTEXT OF A VOICE-CALL

(75) Inventors: Ronen Shalom David, Carmiel (IL); Ella Pinski, Rishon-Le-Zion (IL); Noam Mordechai Eshel, Tel Aviv (IL); Yael Ashkenazi, Ramat Hasharon (IL)

(73) Assignee: Comverse Ltd., Tel Aviv (IL)

( * ) Notice: Subject to any disclaimer, the term of this patent is extended or adjusted under 35 U.S.C. 154(b) by 645 days.

(21) Appl. No.: 12/360,388

(22) Filed: Jan. 27, 2009

(65) Prior Publication Data
US 2009/0191852 A1    Jul. 30, 2009

Related U.S. Application Data

(60) Provisional application No. 61/006,692, filed on Jan. 28, 2008.

(51) Int. Cl.
*H04L 12/58* (2006.01)
*H04M 1/725* (2006.01)
(52) U.S. Cl. .............. 455/412.1; 455/567; 455/414.1; 379/164
(58) Field of Classification Search .......... 455/567, 455/412.1, 414.1; 379/207.16, 164
See application file for complete search history.

(56) References Cited

U.S. PATENT DOCUMENTS

| | | | |
|---|---|---|---|
| 2004/0174983 A1 | 9/2004 | Olschwang et al. | |
| 2007/0121595 A1* | 5/2007 | Batni et al. | 370/356 |
| 2007/0268359 A1* | 11/2007 | Zhang et al. | 348/14.01 |
| 2007/0291776 A1* | 12/2007 | Kenrick et al. | 370/401 |

FOREIGN PATENT DOCUMENTS

| | | |
|---|---|---|
| JP | 11-275232 A | 10/1999 |
| WO | 00/49793 A | 8/2000 |
| WO | 00/62524 A1 | 10/2000 |

\* cited by examiner

*Primary Examiner* — Nick Corsaro
*Assistant Examiner* — Quan Hua
(74) *Attorney, Agent, or Firm* — Ohlandt, Greeley, Ruggiero & Perle, L.L.P.

(57) ABSTRACT

A system for providing multimedia ring back for a voice-call. The system may include an MMRB for VC control module and a network access module operatively connected to the MMRB for VC control module. The network access module is adapted to interface the MMRB for VC control module with external network components. The MMRB for VC control module is responsive to an indication that a caller is inviting a callee to join the voice-call with the caller and wherein the caller and/or the callee is subscribed to an MMRB for VC service for invoking an MMRB for VC service. The MMRB for VC control module is responsive to an indication that the callee received an invitation message and is now pending acceptance of the voice-call, for causing the caller to adapt its media-specification for the ongoing voice-call establishment process to a media-specification that is compatible with multimedia-content communication, thereby enabling a multimedia-content communication with the caller during at least a portion of the ongoing voice-call establishment process.

30 Claims, 8 Drawing Sheets

METHOD AND A SYSTEM FOR ENABLING MULTIMEDIA RING-BACK-WITHIN THE CONTEXT OF A VOICE-CALL

CROSS-REFERENCE TO RELATED APPLICATIONS

This application claims the benefit of U.S. Provisional Patent Application No. 61/006,692, filed Jan. 28, 2008, the full disclosure of which is incorporated herein by reference for all purposes.

FIELD OF THE INVENTION

This invention relates to a method and system for enabling multimedia ring-back-within the context of a voice-call.

BACKGROUND OF THE INVENTION

Several publications are known that describe the exchange of the ring back tone with a configurable ring back tone. These publications are described below, and each is incorporated herein by reference.

For example, International Application Publication No. WO 00/49793 to Kim Kangsuk et al., discloses an advertising method by using a ring-back tone. According to WO 00/49793, a controller employed in a sender-side switching system recognizes a sender's telephone number and a receiver's telephone number dialed at the sender's telephone set. Then the receiver's telephone number is transmitted to a receiver-side switching system at a calling stage. The receiver-side switching system checks the state of the receiver's telephone, e.g., ready or busy, and, subsequently, sends, e.g., a ring-back tone in conformity to the state to the sender-side switching system. The sender-side switching system receives the ring-back tone. In case the ring-back tone is a busy tone, the sender-side switching system forwards the busy tone to the sender's telephone set. Otherwise, that is, the ring-back tone is a ringing tone which implies that the receiver's telephone is ready to receive a call, the sender-side switching system searches registered member information by consulting a database linked to the controller and checks if the receiver's telephone number matches a registered member in the database. If the sender is determined not to be a registered member, the sender-side switching system forwards the ring-back tone; otherwise, it sends a predetermined advertisement message stored in an advertisement memory to the sender's telephone set. If a response, e.g., a hook-off, from the receiver's telephone is perceived or if the sender terminates the call, the sender-side switching system stops the sending of the advertisement message.

International Application Publication No. WO 00/62524 to Han Dong Shik discloses a ring back tone/busy tone selection-type communication in which instead of conventional tones, a music signal and an information voice signal is transmitted to the caller.

Japanese Application Publication No. JP 11-275,232 to Yabusaki Masami et al. identifies the need to provide a system capable of sending a high-efficiency voice coded ring back tone to a line by transmitting music or voice set by a customer to the terminal of a communicating party as a customer-original ring back tone. JP 11-275,232 discloses a call controller that instructs a voice storage calling device to transmit a ring back tone through a communication line to another exchange. The voice storage calling device selects a ring back tone corresponding to a callee and sends the selected ring back tone to a call originating terminal. The customer can transmit any music or voice to the terminal of a party as a customer-original ring back tone.

U.S. Patent Application Publication No. US2004174983A to Arbel Benny et al. discloses a method and a system for providing configurable call progress tones in a telephony session by identifying a receiver of the telephony session, selecting a tone in accordance with the preferences of the receiver and providing a configurable call progress tone of the selected tone.

SUMMARY OF THE INVENTION

In accordance with an exemplary embodiment of the invention, there is provided a method of providing multimedia ring back for a voice-call, comprising: in response to an indication that a caller is inviting a callee to join a voice-call with the caller, and wherein least one of the caller or the callee is subscribed to an MMRB for VC service, enabling receipt by a multimedia ring-back ("MMRB") for voice-call ("VC") system of session establishment messages from the caller and from the callee; and in response to receipt by the MMRB for VC system of an indication that the callee has accepted the invitation and is now pending acceptance of the voice-call, sending a request for adapting the caller's media specification for the ongoing session to a media-specification that is compatible with multimedia-content communication, thereby enabling a multimedia-content communication with the caller during at least a portion of the ongoing voice-call establishment process.

In accordance with an exemplary embodiment of the invention, the method includes in response to an indication that the callee has accepted the voice-call, sending a request for adapting the caller's media specification to a media-specification that is compatible with voice communication, thereby enabling initiation of a voice-call between the caller and the callee.

In accordance with a still further exemplary embodiment of the invention, the indications received at the MMRB for VC system and the requests for adapting the caller's media specification correspond to respective session initiation protocol ("SIP") messages.

In accordance with a still further exemplary embodiment of the invention, the method includes translating SIP messages received at the MMRB for VC system to corresponding input parameters of internal methods and translating output parameters of internal methods of the MMRB for VC system to corresponding SIP messages.

In accordance with a still further exemplary embodiment of the invention, the method may include in response to the indication that the callee has accepted the invitation and is now pending acceptance of the voice-call, sending a provisional media response message with a media specification that is compatible with a voice-call, and triggering the request for adapting the caller's media specification to a media-specification that is compatible with multimedia-content communication in response to an indication that the caller has acknowledged the provisional response.

In accordance with a still further exemplary embodiment of the invention, the indication that a caller is inviting a callee to join the voice-call with the caller corresponds to an Invite message with SDP that is compatible with a voice-call.

In accordance with a still further exemplary embodiment of the invention, the indication that the callee has accepted the invitation and is now pending acceptance of the voice-call corresponds to a provisional response Ringing message.

In accordance with a still further exemplary embodiment of the invention, the request for adapting the caller's media specification to a media-specification that is compatible with multimedia-content communication corresponds to an Update message with an SDP that is compatible with multimedia content, and the request for adapting the caller's media specification back to a media-specification that is compatible with voice communication corresponds to an Update message with an SDP that is compatible with a voice-call.

In accordance with a still further exemplary embodiment of the invention, the provisional media response is a Session Progress message with a media specification that is compatible with a voice-call, and the indication that the caller has acknowledged the provisional response corresponds to a PRACK message.

In accordance with a still further exemplary embodiment of the invention, the method may include suspending the provisional response Ringing message from reaching the caller and instead sending the provisional media response.

In accordance with a still further exemplary embodiment of the invention, the method includes in response to an indication that the caller acknowledged the request for adapting the caller's media specification to a media-specification that is compatible with multimedia-content communication, further causing a multimedia distribution and control module to initiate a multimedia communication with the caller.

In accordance with a still further exemplary embodiment of the invention, the method includes further in response to the indication that the caller has accepted the voice-call, causing a multimedia distribution and service module to end the multimedia communication with the caller.

In accordance with a still further exemplary embodiment of the invention, causing a multimedia distribution and control module to initiate a multimedia communication with the caller comprising an instruction including certain data and/or parameters related to the current instance of the MMRB for VC service in order to initiate and configure a multimedia communication with the caller, and communicating the instruction to the multimedia distribution and service module.

In accordance with a still further exemplary embodiment of the invention, the data and/or parameters included within the instruction are indicative of a multimedia-content resource that is related to the current instance of the MMRB for VC service.

In accordance with a still further exemplary embodiment of the invention, the method may include monitoring and recording various data and events related to the MMRB for VC service based on indications corresponding to SIP messages received at the MMRB for VC system during the voice-call establishment process.

In accordance with a still further exemplary embodiment of the invention, the MMRB for VC system is registered on a HLR and/or on a VLR in association with the MMRB for VC service.

In accordance with a further exemplary embodiment of the invention, there is provided a system for providing multimedia ring back for a voice-call, comprising an MMRB for VC control module and a network access module operatively connected to the MMRB for VC control module. The network access module is adapted to interface the MMRB for VC control module with external network components. The MMRB for VC control module is responsive to an indication that a caller is inviting a callee to join the voice-call with the caller and wherein the caller and/or the callee is subscribed to an MMRB for VC service for invoking an MMRB for VC service, and the MMRB for VC control module is responsive to an indication that the callee received an invitation message and is now pending acceptance of the voice-call, for causing the caller to adapt its media-specification for the ongoing voice-call establishment process to a media-specification that is compatible with multimedia-content communication, thereby enabling a multimedia-content communication with the caller during at least a portion of the ongoing voice-call establishment process.

In accordance with a still further exemplary embodiment of the invention, the MMRB for VC control module is responsive to an indication that the callee has accepted the voice-call for sending a request for adapting the caller's media specification to a media-specification that is compatible with voice communication, thereby enabling initiation of a voice-call between the caller and the callee.

In accordance with a still further exemplary embodiment of the invention, the network access module is a session initiation protocol ("SIP") gateway which interfaces the MMRB for VC control module with components of a communication network supporting IMS and utilizing SIP, including with the caller and the callee.

In accordance with a still further exemplary embodiment of the invention, the MMRB for VC control module is responsive to the indication that the callee has accepted the invitation and is now pending acceptance of the voice-call for causing a provisional media response message with a media specification that is compatible with a voice-call to be sent to the caller, and wherein the MMRB for VC control module is responsive to an indication that the caller has acknowledged the provisional response for causing the caller to adapt its media-specification to a media-specification that is compatible with multimedia-content communication.

In accordance with a still further exemplary embodiment of the invention, the MMRB for VC control module is adapted to attach to a multimedia initiation instruction certain data and/or parameters which are related to the current instance of the MMRB for VC service to thereby accordingly initiate and configure a multimedia communication with the caller.

In accordance with a still further exemplary embodiment of the invention, the indication that a caller is inviting a callee to join the voice-call with the caller corresponds to an Invite message with SDP that is compatible with a voice-call.

In accordance with a still further exemplary embodiment of the invention, the indication that the callee has accepted the invitation and is now pending acceptance of the voice-call corresponds to a provisional response Ringing message.

In accordance with a still further exemplary embodiment of the invention, the request for adapting the caller's media specification to a media-specification that is compatible with multimedia-content communication corresponds to an Update message with an SDP that is compatible with multimedia content, and the request for adapting the caller's media specification to a media-specification that is compatible with voice communication corresponds to an Update message with an SDP that is compatible with a voice-call.

In accordance with a still further exemplary embodiment of the invention, the provisional media response is a Session Progress message with a media specification that is compatible with a voice-call, and the indication that the caller has acknowledged the provisional response corresponds to a PRACK message.

In accordance with a still further exemplary embodiment of the invention, the MMRB for VC control module is adapted to suspend the provisional response Ringing message and instead causes the provisional media response to be sent.

In accordance with a still further exemplary embodiment of the invention, the MMRB for VC control module is responsive to an indication that the caller acknowledged the request for adapting the media specification to a media-specification that is compatible with multimedia-content communication for causing a multimedia distribution and control module to initiate a multimedia communication with the caller.

In accordance with a still further exemplary embodiment of the invention, the MMRB for VC control module is further responsive to the indication that the caller has accepted the voice-call for causing a multimedia distribution and service module to end the multimedia communication with the caller.

In accordance with a still further exemplary embodiment of the invention, the MMRB for VC module is adapted to include certain data and/or parameters which are related to the current instance of the MMRB for VC service within an instruction to initiate and configure a multimedia communication with the caller, and wherein the MMRB for VC module is adapted to communicate the instruction to the multimedia distribution and service module.

In accordance with a still further exemplary embodiment of the invention, the MMRB for VC control module is adapted to include within the instruction to initiate and configure a multimedia communication with the caller data and/or parameters which are indicative of a multimedia-content resource that is related to the current instance of the MMRB for VC service.

In accordance with a still further exemplary embodiment of the invention, the MMRB for VC control module is adapted to monitor and record various data and events related to the MMRB for VC service based on indications corresponding to SIP messages received at the MMRB for VC system during the voice-call establishment process.

In accordance with a still further exemplary embodiment of the invention, the MMRB for VC system is registered on a HLR and/or on a VLR in association with the MMRB for VC service.

In accordance with a still further exemplary embodiment of the invention, there is provided a method of providing multimedia ring back for a voice-session, comprising: receiving on an MMRB for VC system an indication that a caller is inviting a callee to join a voice-call with the caller, wherein least one of the caller or the callee being subscribed to an MMRB for VC service, for invoking a MMRB for VC service; receiving on the MMRB for VC system an indication that the callee has accepted the invitation and is now pending acceptance of the voice-call; in response to the indication that the callee has accepted the invitation, invoking a media-specification modification sequence with the caller to modify the media-specification on the caller to a media-specification compatible with receipt of multimedia-content; and causing a multimedia-session with the caller to be initiated during the ongoing session establishment process.

In accordance with a still further exemplary embodiment of the invention, the method may include receiving on the MMRB for VC system an indication that the callee has accepted the voice-session; and in response to the indication that the callee has accepted the voice-session sending the caller a request for adapting the media-specification back to a media-specification that is compatible with voice communication, thereby enabling a voice-session between the caller and the callee.

In accordance with a still further exemplary embodiment of the invention, there is provided a method of operating a communication system, comprising: detecting an invitation message whereby a caller invites a callee to join a voice-session with the caller, wherein least one of the caller or the callee being subscribed to an MMRB for VC service; in response to detection of the invitation message, adding an MMRB for VC system to the call establishment path to enable the MMRB for VC system to receive session establishment messages from the caller and from the callee; detecting a message from the callee indicating receipt of the invitation and that the callee is now pending acceptance of the voice-session; in response to the message from the callee indicating receipt of the invitation, sending the caller a request for adapting the media specification for the ongoing session to a media-specification that is compatible with multimedia-content communication, thereby enabling a multimedia-content communication with the caller during at least a portion of the ongoing voice-session establishment process.

In accordance with a still further exemplary embodiment of the invention, the method may include detecting a message from the callee indicating acceptance of the voice-session; and in response to the message from the callee indicating acceptance of the voice-session, sending the caller a request for adapting the media-specification back to a media-specification that is compatible with voice communication, thereby enabling a voice-session between the caller and the callee.

In accordance with a still further exemplary embodiment of the invention, there is provided a method of providing multimedia ring back for a voice-call, comprising: in response to an indication that a caller is inviting a callee to join a voice-session with the caller and wherein at least one of the caller or the callee is subscribed to an MMRB for VC service, invoking the MMRB service; in response to invocation of the MMRB service, obtaining a reference to a multimedia-content resource based at least on a reference to the MMRB service subscriber and causing a multimedia-content communication to be established with the caller in parallel with the ongoing voice-session establishment process; and in response to a message from the callee indicating acceptance of the voice-call by the callee, ending the multimedia-content communication, and initiating a voice-call between the caller and the callee.

In accordance with a still further exemplary embodiment of the invention, causing a multimedia-content communication to be established is responsive to an indication that the callee received an invitation message and is now pending acceptable of the voice-call.

In accordance with a still further exemplary embodiment of the invention, obtaining a reference to a multimedia-content resource comprises: generating a Request media message; communicating the Request to a multimedia-resource management module; and receiving a Response media message with a reference to a selected multimedia-content resource.

In accordance with a still further exemplary embodiment of the invention, causing a multimedia-content communication to be established with the caller that is triggered by an indication that the callee has accepted the invitation and is now pending acceptance of the voice-call.

In accordance with a still further exemplary embodiment of the invention, further in response to the invocation of the MMRB service, causing a request for reporting call events to be sent to a service switching point ("SSP") or to a mobile service switching centre ("MSC").

In accordance with a still further exemplary embodiment of the invention, causing a multimedia-content communication to be established with the caller including causing a Multimedia Messaging Services Center ("MMSC") to initiate a multimedia communication with the caller using the selected multimedia-content resource.

In accordance with a still further exemplary embodiment of the invention, causing an MMSC to initiate a multimedia communication comprising sending an instruction to the MMSC which includes a network address of the caller and a reference to the selected multimedia-content resource that is to be communicated to the caller.

In accordance with a still further exemplary embodiment of the invention, the indication that a caller is inviting a callee to join the voice-call with the caller corresponds to an Initial Detection Point ("Initial DP") message that includes data that is indicative of the caller and/or the callee and specifying the MMRB for VC as the service to be activated.

In accordance with a still further exemplary embodiment of the invention, causing a multimedia-content communication to be established with the caller comprising requesting the caller to accept a multimedia-communication during the ongoing voice-call establishment process.

In accordance with a still further exemplary embodiment of the invention, requesting the caller to accept a multimedia-communication comprising causing a request to accept a multimedia-communication with a reference to the selected multimedia-content resource to be communicated to the caller.

In accordance with a still further exemplary embodiment of the invention, the request is a Unstructured Supplementary Service Request (USSR) message.

In accordance with a still further exemplary embodiment of the invention, the reference to the selected multimedia-content resource is related to a multimedia-content resource hosted on the multimedia distributor and enabling the caller to connect to the media distributor using the reference included in the USSR request, thereby initiating a multimedia communication with the media distributor.

In accordance with a still further exemplary embodiment of the invention, causing a request to accept a multimedia-communication with a reference to the selected multimedia-content resource to be communicated to the caller comprising exchanging USSD messages with an HLR or VLR to determine Routing Info for SM messages.

In accordance with a still further exemplary embodiment of the invention, there is provided a system for providing multimedia ring back for a voice-call, comprising: an MMRB for VC control module, a service control point ("SCP") gateway and an MMS gateway. Each of the SCP gateway and the MMS gateway is operatively connected to the MMRB for VC control module. The SCP gateway is adapted to interface the MMRB for VC control module with external network components. The MMS gateway is adapted to interface the MMRB for VC control module with an MMSC. The MMRB for VC control module is responsive to an indication that a caller is inviting a callee to join the voice-call with the caller and wherein least one of the caller or the callee is subscribed to an MMRB for VC service for invoking an MMRB for VC service. The MMRB for VC control module is responsive to an indication that the callee received an invitation message and is now pending acceptance of the voice-call, for causing an MMSC to initiate a multimedia-content communication between the MMSC and the caller during at least a portion of the ongoing voice-call establishment process.

In accordance with a still further exemplary embodiment of the invention, the MMRB for VC control module is responsive to an indication that the callee accepted the voice-call for causing an MMSC to end the multimedia-content communication with the caller.

In accordance with a still further exemplary embodiment of the invention, the MMRB for VC control module is adapted to obtain a reference to a multimedia-content resource based at least on a reference to the MMRB service subscriber.

In accordance with a still further exemplary embodiment of the invention, the MMRB for VC control module is adapted to request the reference to a selected multimedia-content resource from a multimedia-resource management module.

In accordance with a still further exemplary embodiment of the invention, the MMRB for VC control module is adapted to include in the request certain data and/or parameters which are related to the current instance of the MMRB for VC service.

In accordance with a still further exemplary embodiment of the invention, further in response to the invocation of the MMRB service the MMRB for VC control module is adapted to cause a request for reporting call events to be sent to a service switching point ("SSP") or to a mobile service switching centre ("MSC").

In accordance with a still further exemplary embodiment of the invention, the MMRB for VC module is adapted to utilize the MMS gateway to cause an MMSC to initiate a multimedia communication with the caller using the selected multimedia-content resource.

In accordance with a still further exemplary embodiment of the invention, the MMRB for VC module is adapted to utilize the MMS gateway to send an instruction to the MMSC which includes a network address of the caller and a reference to the selected multimedia-content resource that is to be communicated to the caller.

In accordance with a still further exemplary embodiment of the invention, there is provided a system for providing multimedia ring back for a voice-call, comprising: an MMRB for VC control module a service control point ("SCP") gateway and a USSD gateway. Each one of the SCP gateway and the USSD gateway is operatively connected to the MMRB for VC control module. The SCP gateway is adapted to interface the MMRB for VC control module with external network components. The USSD gateway is adapted to interface the MMRB for VC control module with USSD enabled devices. The MMRB for VC control module is responsive to an indication that a caller is inviting a callee to join the voice-call with the caller and wherein the caller and/or the callee is subscribed to an MMRB for VC service for invoking a MMRB for VC service. The MMRB for VC control module is responsive to an indication that the callee received an invitation message and is now pending acceptance of the voice-call, for causing an MMSC to initiate a multimedia-content communication between the MMSC and the caller during at least a portion of the ongoing voice-call establishment process.

In accordance with a still further exemplary embodiment of the invention, the MMRB for VC control module is responsive to an indication that the callee accepted the voice-call for causing the multimedia-content communication with the caller to be terminated.

In accordance with a still further exemplary embodiment of the invention, the MMRB for VC control module is adapted to obtain a reference to a multimedia-content resource based at least on a reference to the MMRB service subscriber.

In accordance with a still further exemplary embodiment of the invention, the MMRB for VC control module is adapted to request the reference to a selected multimedia-content resource from a multimedia-resource management module.

In accordance with a still further exemplary embodiment of the invention, the MMRB for VC control module is adapted to include in the request certain data and/or parameters which are related to the current instance of the MMRB for VC service.

In accordance with a still further exemplary embodiment of the invention, the MMRB for VC control module is adapted to cause a request to the caller to be issued whereby the caller is request to accept a multimedia-communication, and to include in the request a reference to the selected multimedia-content resource.

In accordance with a still further exemplary embodiment of the invention, the request is a Unstructured Supplementary Service Request (USSR) message.

In accordance with a still further exemplary embodiment of the invention, the reference to the selected multimedia-content resource is related to a multimedia-content resource hosted on a multimedia distributor, thereby enabling the caller to connect to the media distributor using the reference included in the USSR request and initiate a multimedia communication with the media distributor.

In accordance with a still further exemplary embodiment of the invention, the MMRB for VC control module is adapted to utilize the USSD Gateway to exchange USSD messages with an HLR or VLR to determine Routing Info for SM message.

Illustrative Glossary

The following terms or abbreviations are used in the present application. The meanings set out in this glossary are for illustrative purposes only. The full meaning of the terms will be apparent to those of skill in the art.

"IMS" is used as an abbreviation for a "IP Multimedia Subsystem". IMS is an architectural framework for delivering Internet Protocol (IP) multimedia services over an integrated network of telecommunication carriers. IMS facilitates the use of IP (Internet Protocol), such as SIP, to interconnect two or more nodes within the network.

"CSCF" is used as an abbreviation for a "Call Session Control Function". A Call Session Control Function is the first point of contact for the IMS terminal. It handles registration (including authentication) and routes messages to and from the user according to its specific characteristic as defined in the HSS (which is described below). In the case of a multimedia ring back for voice-call service, the CSCF may be configured to route calls to an MMRB server according to the specific implementation: user subscription/advertisement sponsored or any other model for subscribing to the service.

"HSS" is used as an abbreviation for a "Home Subscriber Server". HSS is the master user profile database of the IMS network. Among other data that is stored on an HSS, it contains subscription-related information of all users. As described above, the CSCF inquires to the HSS about services for or about a profile of a specific user and decides on the routing of the call accordingly.

"MRF" is used as an abbreviation for a "Media Resource Function". An MRF provides media related functions in the IMS architecture. In particular, in the context of some exemplary embodiments of the present invention, the MRF provides multimedia related functions in the IMS architecture. The MRF is adapted to stream or otherwise transfer or distribute selected multimedia content to specified users' terminals. The multimedia server to which reference is made throughout the specification and the claims may include and utilize an MRF to stream or otherwise transfer or distribute selected multimedia content to a caller.

"SIP" is used as an abbreviation for "Session Initiation Protocol". SIP is an application-layer control protocol that can be used for setting up and tearing down multimedia communication sessions. SIP can be used to establish a variety of sessions and services including, for example, Internet telephony voice sessions, videoconferencing sessions, interactive gaming sessions, multimedia streaming sessions, all deployed over IP networks.

"IN" is used as an abbreviation for "intelligent network". IN is a network architecture intended both for fixed and mobile communication networks. It allows value-added services in addition to the standard telecom services such as PSTN, ISDN and GSM services on mobile phones. IN architecture allows service decomposition and separation between switching (SSP) and service control (SCP) network elements.

"SCP" is used as an abbreviation for "Service Control Point". SCP or SCP Gateway is the component of IN that performs control of a service triggered by a voice call, GPRS data connection or short messaging and performs call events collection. Standard SCP's in the telecom industry today are deployed using SS7, Sigtran or SIP technologies. The SCP queries the SDP (Service Data Point) which holds the actual database and directory. SCP may also communicate with an "intelligent peripheral" (IP) to play voice messages, or prompt for information to the user, such as prepaid long distance using account codes. SCPs are connected with SSPs. Based on service logic, the SCP requests the SSP to perform call processing functions and deliver call related events.

"MSC/GMSC" are used as abbreviations for "mobile service switching centre" and "gateway mobile service switching centre", respectively. "SSP" is used as an abbreviation for "Service Switching Point". "MSC/GMSC" with SSP capabilities transfers call control to the SCP. Based on service logic, the SCP requests the Service Switching Function ("SSF") to perform call processing functions and deliver call related events.

"MMSC" is used as an abbreviation for a "Multimedia Messaging Services Center", also sometimes referred to as a "content adaptation". An MMSC is responsible for delivering multimedia messages between two parties. A MMSC may also be intended to modify the multimedia content into a format suitable for a receiver.

"BCSM" is used as an abbreviation for "Basic Call State Model". BSCM is a fundamental concept for IN control. When a call is processed by an exchange, the call goes through a number of pre-defined phases. These phases of the call are described in the BCSM. The BCSM generally follows the ISUP signalling of a call (ISUP is the ISDN User Part used in SS7 signaling).

"USSD" is used as an abbreviation for "Unstructured Supplementary Service Data". USSD is a standard for transmitting information over GSM signaling channels. It is a capability built into the GSM standard that supports transmitting text information (request/response) using the SS7 signaling channels of the GSM network. No audio/voice channels have to be allocated to provide an USSD application's service. USSD provides interactive, session-based communication, enabling a variety of service applications. The function that is triggered when sending USSD is network-dependent and depends on the specific services the operator is offering.

BRIEF DESCRIPTION OF THE DRAWINGS

In order to understand the invention and to see how it may be carried out in practice, exemplary embodiments will now be described, by way of non-limiting example only, with reference to the accompanying drawings, in which.

Figure 1:
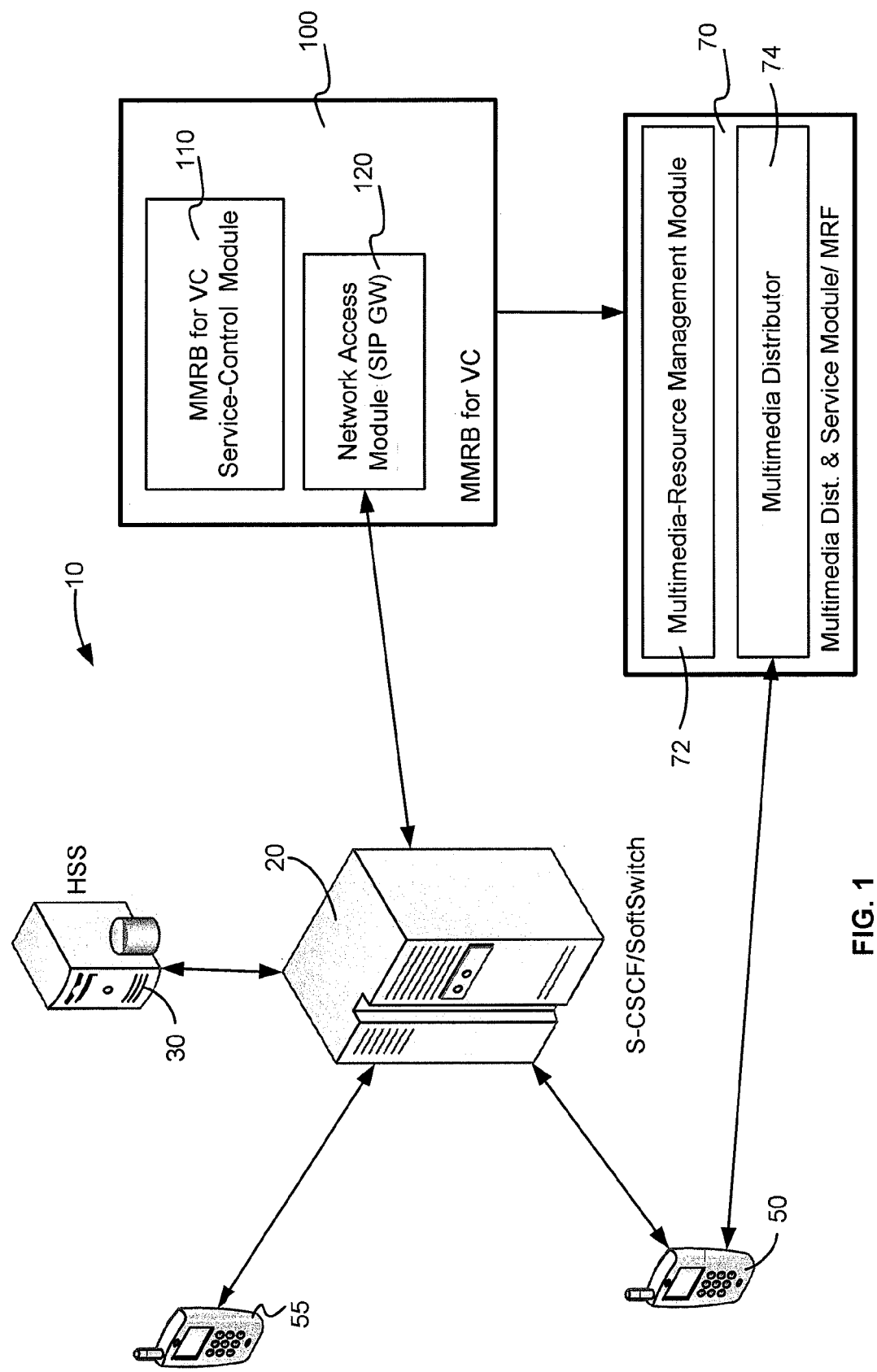
FIG. 1 is a block diagram illustration of a system according to an exemplary embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "configuring" or the like, refer to the action and/or processes of a computer that manipulate and/or transform data into other data, the data represented as physical, e.g. such as electronic, quantities. The term "computer" should be expansively construed to cover any kind of electronic device with data processing capabilities, including, by way of non-limiting example, personal computers, servers, handheld computer systems, Pocket PC devices, Cellular communication device and other communication devices with computing capabilities, processors and microcontrollers (e.g. digital signal processor (DSP) possibly in combination with memory and storage units, application specific integrated circuit "ASIC", etc.) and other electronic computing devices.

The operations in accordance with the teachings herein may be performed by a computer specially constructed for the desired purposes or by a general purpose computer specially configured for the desired purpose or for the desired operations by a computer program stored in a computer readable storage medium.

In addition, exemplary embodiments of the present invention are not described with reference to any particular programming language. It will be appreciated that a variety of programming languages may be used to implement the teachings of the inventions as described herein.

Throughout the specification and the claims reference is made to the terms "multimedia", "multimedia content" and "multimedia ring back" or "MMRB" in abbreviation and the like. The multimedia-content to which reference is made herein may be communicated to a network destination node (namely, the caller, as will be described below) via a multimedia-session with the destination node or via a multimedia compatible data-session with the destination node.

Throughout the specification and the claims reference is made to the terms "caller" and "callee" or to the interchangeable terms "caller device" and "callee device". A caller and a callee as used herein relate to any source and any destination, respectively, of a voice-call. A caller is sometimes referred to as a calling number, and a callee is sometimes referred to as a called number. There are various presently known and yet to be devised in the future communication devices with communication capabilities that are adapted to initiate and/or to participate in a voice-call. Any such devices may be used herein as the caller or the callee. Non-limiting examples of devices which may be used as a caller and/or callee, include any one of the following: phones, mobile devices utilizing wireless communication, such as PDAs, Pocket PCs, laptops, etc. that are connectable to a network via a wireless communication (including a cellular network, a WLAN network, a WWAN network or any other wireless technology); and devices which are fixedly connected to a communication network, such as a video-phone terminal, a PC, a TV connected to a networked set-top-box (STB) connected through telephony lines (Copper), network or Ethernet cables, Fiber Optics or other relevant media.

Reference is now made to FIG. 1 which is a block diagram illustration of one possible implementation of a system 100 for providing a multimedia ring back (MMRB) service within the context of a voice-call (also sometimes referred to herein as a system for providing a MMRB for a voice-call) and of associated components, according to some exemplary embodiments of the invention. The implementation of the system 100 shown in FIG. 1 is compatible with a communication network, i.e., network 10 supporting IMS and utilizing SIP, as will be described below. Further aspects of the invention contemplate other implementations of the system for enabling an MMRB for voice-call ("VC") service which are compatible with other types of communication networks. Additional examples of possible implementations of the present invention will be described in further detail below. Yet a further exemplary embodiment of the invention contemplates a generic implementation of the system for enabling an MMRB for VC service which is compatible with two or more types of network environments for which a dedicated system implementation is discussed herein. Such a generic implementation of the system may enable an MMRB service for a voice-call that is established over any one of a plurality of different networks. The inventors of the present invention also contemplate integration of any of the proposed implementations of the system for providing an MMRB for VC service with existing systems for providing multimedia ring back (which are not themselves capable of providing an MMRB in the context of a voice-call) and/or with existing systems for providing a ring-back tone ("RBT") (which are not capable of providing multimedia ring back). Integration of various implementations of the proposed MMRB for VC system with existing systems for providing multimedia ring back and/or with systems for providing a RBT may require certain additions, configurations and modifications which would be apparent to those versed in the art.

Returning now to FIG. 1, according to some exemplary embodiments of the invention, the system 100 may include a MMRB for VC control module 110 and a network access module 120. The network access module 120 may be operatively connected to the MMRB for VC control module 110. As a non-limiting example, the system 100 may be connected to a servicing Call Session Control Function (S-CSCF) 20 (or softswitch) which is part of a network utilizing SIP as the interconnection protocol. As will be described in further detail below, the network access module 120 may provide an interface between components of the system 100 and in particular the MMRB for VC control module 110 and the external network components. Further by way of a non-limiting example, the system 100 may be operatively connected to a multimedia distribution and service module 70. The interaction between system 100 and the multimedia service and distribution module 70 shall be described in further detail below.

The MMRB for VC control module 110 may be adapted to invoke, initiate, terminate and otherwise manage an MMRB for VC service. In the following description, the functionality of the MMRB for VC control module 110 and of other components of the system 100 is described with reference to one instance of a MMRB for VC service, however, the system 100 and the MMRB for VC module 110 may be adapted to handle a plurality of different and concurrent instances of the MMRB for VC service. In some exemplary embodiments, the MMRB for VC control module 110 may be implemented as an application server.

The MMRB for VC control module 110 may be adapted to enable an MMRB for VC service during at least a portion of an ongoing voice-call (or voice-session) establishment process. The MMRB for VC control module 110 is configured to receive indications which correspond to certain messages from a caller 50 and to receive indications which correspond to certain messages from a callee 55, during an ongoing process for establishing the voice-call between the caller 50 and the callee 55. The MMRB for VC service may be enabled in response to an invitation message indicating that the caller 50 invites the callee 55 to join the voice-call session. In some exemplary embodiments, the enablement of the MMRB for VC service in the context of a certain voice-call may be contingent upon at least one of the caller 50 or callee 55 being subscribed to the MMRB for VC service.

For clarity, it would be appreciated that in accordance with exemplary embodiments of the invention, the subscription to the MMRB for VC service may be determined outside the system 100, and prior to the invocation of the MMRB for VC service. Nonetheless, in some exemplary embodiments, the invocation of the MMRB for VC service may depend upon at least one of the caller 50 or the callee 55 being subscribed to the MMRB for VC service. An example of one possible process of determining the subscription of a caller 50 and/or of a callee 55 to an MMRB for VC service is provided below.

In some exemplary embodiments, in response to a message indicating receipt of the invitation message and that the callee 55 is now pending acceptance of the voice-call, the MMRB for VC control module 110 may be adapted to cause the caller 50 to adapt its media-specification for the ongoing session. A message indicating receipt of the invitation message and that the callee 55 is now pending acceptance of the voice-call is sometimes referred to as an "Alerting message" or a "Ringing message". The MMRB for VC control module 110 may cause the caller 50 to update its media-specification to a media specification that is compatible with multimedia-content communication. The modification of the caller's 50 media-specification in this manner enables a multimedia-content communication with the caller 50 during (at least a portion of) the ongoing voice-call establishment process, as will be described below. According to exemplary embodiments of the present invention, the voice-call establishment process is continued substantially uninterrupted throughout the initiation and the implementation of the MMRB for VC service.

In response to a message indicating acceptance of the voice-call by the callee 55 (i.e., answering of the call), the MMRB for VC control module 110 may be configured to cause the caller 50 to adapt its media-specification for the ongoing session back to a media-specification that is compatible with voice communication. The modification of the caller's 50 media-specification is intended (this time) to enable a voice-call session with the caller 50, as will be described below. The caller 50 and callee 55 may then be connected and the voice-call therebetween may commence.

Figure 2:
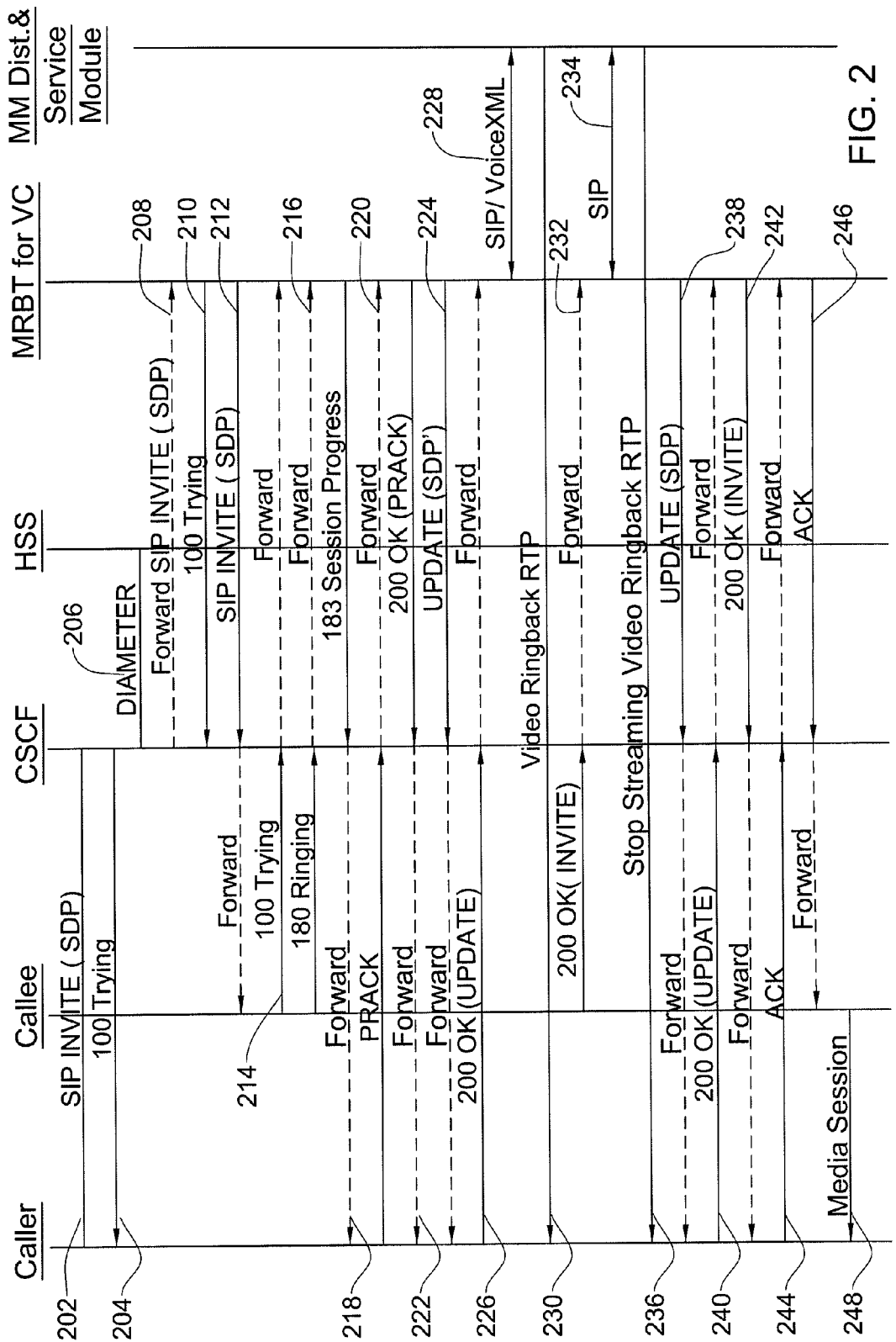
FIG. 2 is a call flow diagram according to the exemplary embodiment of FIG. 1.

In still further exemplary embodiments, the MMRB for VC control module 110 may be adapted to manage other aspects of the MMRB for VC service, including for example, generating billing related data in connection with each instance of the MMRB for VC service, collecting service statistics, etc. It would be appreciated that the MMRB for VC control module 110 can obtain certain data and parameters related to each instance of the MMRB for VC service, including for example, the parties involved, the network ID of the MMRB for VC subscriber, the time at which the service was invoked and the time at which the service was terminated, the duration of the service, etc. Further details with respect to the operation of the MMRB for VC control module 110 shall be provided with reference to the call-flow shown in FIG. 2.

The network access module 120 may be adapted to handle signaling between the internal components of the system 100 and the various components of the network 10 to which the system 100 is connected. In FIG. 1, by way of example, the system 100 is connected to the network 10, and the network access module 120 is thus used as a SIP gateway. The access module interfaces the internal methods of the MMRB for VC control module 110 and other components of the system 100 with external components of the network 10, such as the S-CSCF 20. In some exemplary embodiments, the network access module 120 translates incoming SIP requests to the internal methods of the MMRB for VC control module 110 and inputs the translated SIP requests to the MMRB for VC control module 110. Additionally, the network access module 120 translates outgoing instructions or requests from the MMRB for VC control module 110 to standard SIP requests, and forwards the requests to external components in the network 10. Thus, the network access module 120 may enable the MMRB for VC control module 110 to join an ongoing voice-call establishment process and adapt or generate certain messages communicated during the ongoing voice-call establishment process. Such interactions are described in further detail with reference to the call flow diagram shown in FIG. 2.

As was mentioned above, the system f may be operatively connected to a multimedia distribution and service module 70. The multimedia distribution and service module 70, or the multimedia distributor 74 integrated therein, shown in FIG. 1, is a network device or service that is adapted to distribute multimedia content to a specified node (or nodes) within the network 10. The multimedia distribution and service module 70 may be configured to initiate and configure the multimedia communication according to certain data and parameters received from the system 100. Thus, for example, following the caller 50 updating its media-specification to a media specification that is compatible with multimedia-content communication, the MMRB for VC control module 110 may communicate an instruction for the multimedia distribution and service module 70 to initiate a multimedia communication with the caller 50. The MMRB for VC control module 110 may attach to the multimedia communication initiation instruction, certain data and parameters which are related to the current instance of the MMRB for VC service, and may thus cause the multimedia distribution and service module 70 to initiate and configure the multimedia communication accordingly.

There are various possible implementations of a multimedia distribution and service module 70. The multimedia distribution and service module 70 as an external entity of the 100 according to some exemplary embodiments, and in particular specific implementations thereof, are outside the scope of the invention and are not presented here in detail. There are various known multimedia distribution and service modules which are commercially available, any of which, and in particular multimedia distribution and service modules which support SIP communications, may be used in conjunction with various exemplary embodiments of the system 100, possibly with some modifications which would be apparent to those of ordinary skill in the art. In still further exemplary embodiments of the invention, a multimedia distribution and service module may be integrated with a MMRB for VC system and may be a part thereof.

The multimedia distribution and service module 70 may include various functional and/or physical units which may be used to enable the multimedia communication with the caller 50 based on the data received from the system 100. In accordance with one possible implementation of the multimedia distribution and service module 70, the multimedia distribution and service module 70 may include a multimedia resource management module 72 and a media distributor 74. The media distributor 74 may be adapted to establish a connection with the caller 50 and may communicate certain multimedia content to the caller 50. The multimedia content communicated by the media distributor 74 may be an MMRB that is provided to the caller during an ongoing voice-call establishment process (although the media distributor 74 itself is not aware of this circumstance). The network address of the caller 50 that is used by the media distributor 74 to communicate the multimedia content may have arrived from the system 100 together with an instruction to communicate multimedia content to that specified network address. The media distributor 74, according to the instructions from the system 100, may establish an appropriate connection with the caller 50 and communicate the multimedia content thereto while the voice-call establishment process continues. The selected multimedia-content resource may be hosted or otherwise available to the media distributor 74. In one non-limiting embodiment, the media distributor 74 may stream the multimedia content to the caller 50. However, the media distributor 74 may be adapted to communicate with the caller 50 in various other communication methods including two-way communication methods.

The multimedia resource management module 72 may provide various services related to the multimedia content and services which are related to the communication of the multimedia content to the caller 50 with an MMRB. In some exemplary embodiments, the data from the MMRB for VC control module 110 may provide the multimedia resource management module 72 with an indication with respect to the multimedia content that should be communicated to the caller 50. In further exemplary embodiments, in addition to information from the system 100 related to multimedia content, or as an alternative thereof, the multimedia resource management module 72 may implement some rules and information stored thereon or on external resources with which the multimedia resource management module 72 is associated.

In some exemplary embodiments, the multimedia resource management module 72 may process data from the system 100 (and possibly data from another source, including local data) and may return a reference to a specific multimedia resource, or the actual multimedia content, that is to be used for the MMRB. In one example, the multimedia-resource management module 72 may be adapted to select the specific reference to a multimedia content resource for a certain instance of the MMRB for VC service based at least on an identifier of the subscriber to the MMRB for VC service. As mentioned above, in the context of a voice-call, the subscriber to the MMRB service may be the caller 50, the callee 55 or both. In a further example, the multimedia resource management module 72 may determine which media content is to be used for the MMRB according to an indication from the system 100 with respect to the caller's 50 supported, allowed and/or preferred multimedia formats and according to an indication with respect to the supported, allowed and/or preferred communication method vis-à-vis the caller 50.

The multimedia distribution and service module 70, or the media distributor 74 which is integrated therein, may be also configured to end or terminate a multimedia communication based on an instruction received from the MMRB for VC system 100.

As was mentioned above, the system 100 that is shown in FIG. 1 is particularly compatible for networks which support SIP or a similar interconnectivity protocol. However, FIG. 1 also provides a relatively generic implementation of the proposed system that can be readily adapted and modified to provide the MMRB service in the manner described above for various other network environments. Those of ordinary skill in the art may readily devise such adaptations and configurations and may readily integrate further necessary components based on the description and the examples provided herein. In other network environments more complex adaptation and modifications may be required. In accordance with further aspects of the invention, there are provided further exemplary examples of implementations of the system for providing a MMRB service within the context of a voice-call which are compatible with other network environments. These exemplary embodiments of the invention are described in detail below.

Before describing further exemplary embodiments of the invention, there is now provided a description of a possible call-flow scenario surrounding the initiation, implementation and termination of the MMRB service in the context of a voice-call for a SIP enabled network. Additional reference is now made to FIG. 2, which is a call-flow diagram illustrating one possible implementation of a method of providing a multimedia ring back (MMRB) service within the context of a voice-call for a communication environment utilizing SIP messages, according to some exemplary embodiments of the invention. The call flow and the description thereof supplements the description provided above with reference to FIG. 1. The call-flow sequence is commenced with an initial Invite message 202 with any Session Description Protocol ("SDP") (collectively referenced 202) from a caller. In a further exemplary embodiment, the call-flow sequence is commenced with an initial Invite message 202 message from the caller 50 with SDP that is compatible with a voice-call. By way of example, the SDP may be compliant with RFC 3261 (SIP) and RFC 2327 (SDP). As is well known by those versed in the art, the SDP describes the device capabilities and it is device specific. In some exemplary embodiments, the Invite message 202 with the SDP is received at the CSCF 20 which acknowledges receipt with a Trying (100) message 204 that is communicated to the caller 50. Further in response to receipt of the invite message 202 from the caller 50, the CSCF 20 may interrogate, e.g., using a diameter message 206, a Home Subscriber Server ("HSS") 30 which is operatively connected to the CSCF 20. The CSCF 20 may interrogate the HSS 30 to determine whether the caller 50 and/or the callee 55 (which are determined according to the Invite message 202) are subscribed to an MMRB service.

If the CSCF 20 determines that the caller 50 and/or the callee 55 are subscribed to an MMRB service, the CSCF 20 is adapted to include the system 100 in the session establishment path. Thus, the system 100, or the MMRB service-control module 110 integrated therein, effectively becomes part of the call flow signaling route. As part of the MMRB for VC service, the MMRB for VC control module 110 may be adapted to adapt or generate certain messages communicated during the ongoing voice-call establishment process.

Continuing with the description of the call flow, once the CSCF 20 determines that the caller 50 and/or the callee 55 is subscribed to the MMRB for VC service, in a message 208 the CSCF 20 forwards 208 the Invite message with the SDP to the system 100. As was mentioned above, upon CSCF 20 determining that one of the caller 50 and/or the callee 55 is subscribed to an MMRB service, an indication message corresponding to the Invite message 202 with the SDP may be received at the MMRB for VC control module 110, possibly through the network access module 120. The MMRB for VC control module 110 may acknowledge receipt of the Invite message indication (in message 208) and may utilize the network access module 120 to communicate a Trying (100) message 210 to the CSCF 20.

As mentioned above, upon receipt of Invite message indication (in message 208) at the MMRB for VC control module 110 (where one of the caller 50 and/or the callee 55 is subscribed to an MMRB service), the MMRB for VC control module 110 may invoke an MMRB for VC service for enabling an MMRB, specifically on the caller 50, during at least a portion of the ongoing voice-call establishment process.

In some exemplary embodiments of the invention, following invocation of the MMRB for VC service, the MMRB for VC control module 110 may utilize the network access module 120 to forward the initial Invite message via an Invite message 212 to the original callee 55 (the call recipient) through the CSCF 20. The Invite message 212 to the callee 55 may be the original Invite message 202 from the caller 55.

Continuing with the description of the call-flow diagram, when the callee 55 receives the Invite message 212 with the SDP from the MMRB for VC control module 110 (through the network access module 120 and the CSCF 20), the callee 55 may acknowledge the Invite message with a Trying (100) message 214. The Trying (100) message 214 from the callee 55 may be forwarded by the CSCF 20 to the system 100, and a respective indication may be received at the MMRB service-control module 110. Following acknowledgment of the Invite message 212, the callee 55 may also communicate a provisional response of Ringing (180) message 216 to the system 100 and a respective indication may be received at the MMRB for VC control module 110. As is well known, a provisional response of Ringing (180) message indicates that the callee 55 received the Invite message 212 and is now pending acceptance (or answering) of the voice-call. A call is accepted when it is answered automatically or by a user operating the callee 55 (which is, as explained above, a communication device).

According to some exemplary embodiments, the MMRB for VC control module 110 may be configured to withhold or otherwise suspend the Ringing (180) message 216 from reaching the caller 50. While the Ringing (180) message 216 is suspended, the MMRB service-control module 110 may invoke a sequence of operations and messages that would provide the MMRB to the caller 50 during at least a portion of the ongoing voice-call establishment process. In some exemplary embodiments, in response to the Ringing (180) message 216, the MMRB for VC control module 110, utilizing the network access module 120 and through the CSCF 20, may communicate to the caller 50 an early media response Session Progress (183) message 218 with a media one way SDP. The SDP included or otherwise attached to the Session Progress (183) message 218 may include the network address of the system 100 (or the network address of the MMRB for VC control module 110) and a media specification that is compatible with a voice-call or voice-session. The caller 50 may respond to the Session Progress (183) early media message 218 with a PRACK message 220, e.g., according to RFC 3262. The PRACK message 220 may be used to guarantee that the Session Progress (183 early media) message 218 is a reliable provisional response. The caller's 50 PRACK message 220 may be received at the system 100 and the MMRB for VC control module 110 may receive an indication with respect thereof. The MMRB for VC control module 110 may respond to the PRACK message 220 by causing an OK (200) message 222 to be communicated to the caller 50.

Now that a reliable PRACK response is established, the MMRB for VC control module 110, utilizing the network access module 120 and through the CSCF 20, may send an Update message 224, for example, according to RFC 3311, to change the SDP that was previously established in the Session Progress (183) message 218. The new SDP can now be an SDP that includes a media-specification that is compatible with multimedia content, such as, certain formats of video, audio, images, etc. and various combinations thereof. According to some exemplary embodiments, the media specification with the new SDP is limited only by the types of multimedia formats supported by the caller 50. In some exemplary embodiments, the MMRB for VC control module 110 may send the new SDP according to the available formats of the selected multimedia-content. It would be appreciated that, information with respect to the available formats on the caller 50 may or may not be available to the MMRB for VC system 100. The caller 50 acknowledges the update message 224 and sends an OK (200) message 226 back to the system 100 and an indication corresponding to the OK (200) message 226 is received at the MMRB for VC control module 110.

In response to the acknowledgement (i.e., message 26) of the new SDP by the caller 50, the MMRB for VC system 100 instructs the MRF or multimedia distribution and service module 70 to initiate multimedia communication with the caller 50. For example, the MMRB for VC system 100 may establish a SIP with VoiceXML session 228 with the MRF/multimedia distribution and service module 70. In addition to the instruction to initiate the multimedia communication, the MMRB for VC system 100 may provide the MRF/multimedia distribution and service module 70 with the details of the SDP agreed upon with the caller 50, and in some exemplary embodiments, also with information associated with the content that is to be used for ring back (this information may have been provisioned by the callee 55 for example). The MRF/multimedia distribution and service module 70 may accordingly stream (or otherwise communicate) multimedia 230 to the caller 50, as was described above in further detail.

The media communication with the caller 50 may proceed uninterrupted by the MMRB for VC control module 110, until an indication is received at the MMRB for VC control module 110 which corresponds to an OK (200) message 232 from the callee 55, indicating that the callee 55 is accepting the initial voice-call Invite message 212 (answering the voice-call). In response to the OK (200) message 232 the system 100, utilizing the MMRB for VC control module 110, may signal 234 the MRF/multimedia distribution and service module 70 to stop the multimedia stream or communication to the caller 50 and to end the SIP session 236 with the caller 50.

Further in response to the OK (200) message 232, the MMRB for VC control module 110, utilizing the network access module 120 and through the CSCF 20, may send a SIP UPDATE message 238 to the caller 50, for example, according to RFC 3311, with SDP that is compatible with a voice-call, thereby causing the caller 50 to revert the call SDP to the original SDP. Once the caller adapts its SDP, it sends an OK (200) message 240, and an indication in respect of the OK (200) message 240 is received at the MMRB for VC control module 110.

The MMRB for VC control module 110, utilizing the network access module 120 and through the CSCF 20, may then forward 242 the OK (200) message 232 from the callee 55 indicating that the callee 55 is accepting the initial voice-call Invite message 212 (answering the voice-call). The MMRB for VC control module 110 then receives an indication that an acknowledgement message ACK 244 from the caller 50 was received and forwards 246 the acknowledgement message 244 to the callee 55. Subsequently a voice-call is established 248 between the caller 50 and the callee 55.

Although the description provided above, relates to the modification of a caller's 50 SDP from an SDP that is compatible with a voice-call to an SDP that is compatible with multimedia and then back to an SDP that is compatible with voice-call, further exemplary embodiments of the invention are not limited in this respect. The inventors of the present invention contemplate modification of other types of original SDP to different SDP and then back to the original SDP.

Having described one exemplary embodiment of the invention that is related to an implementation of the MMRB for VC system that is compatible with a communication network supporting IMS and utilizing SIP, there is now provided a description of a further exemplary embodiment of the invention which relates to an implementation of the MMRB for VC system that is compatible with communication network supporting intelligent network ("IN") capabilities. It would be appreciated that the proposed implementation is applicable to any IN-based protocol, such as CAP, INAP or WIN.

Figure 3:
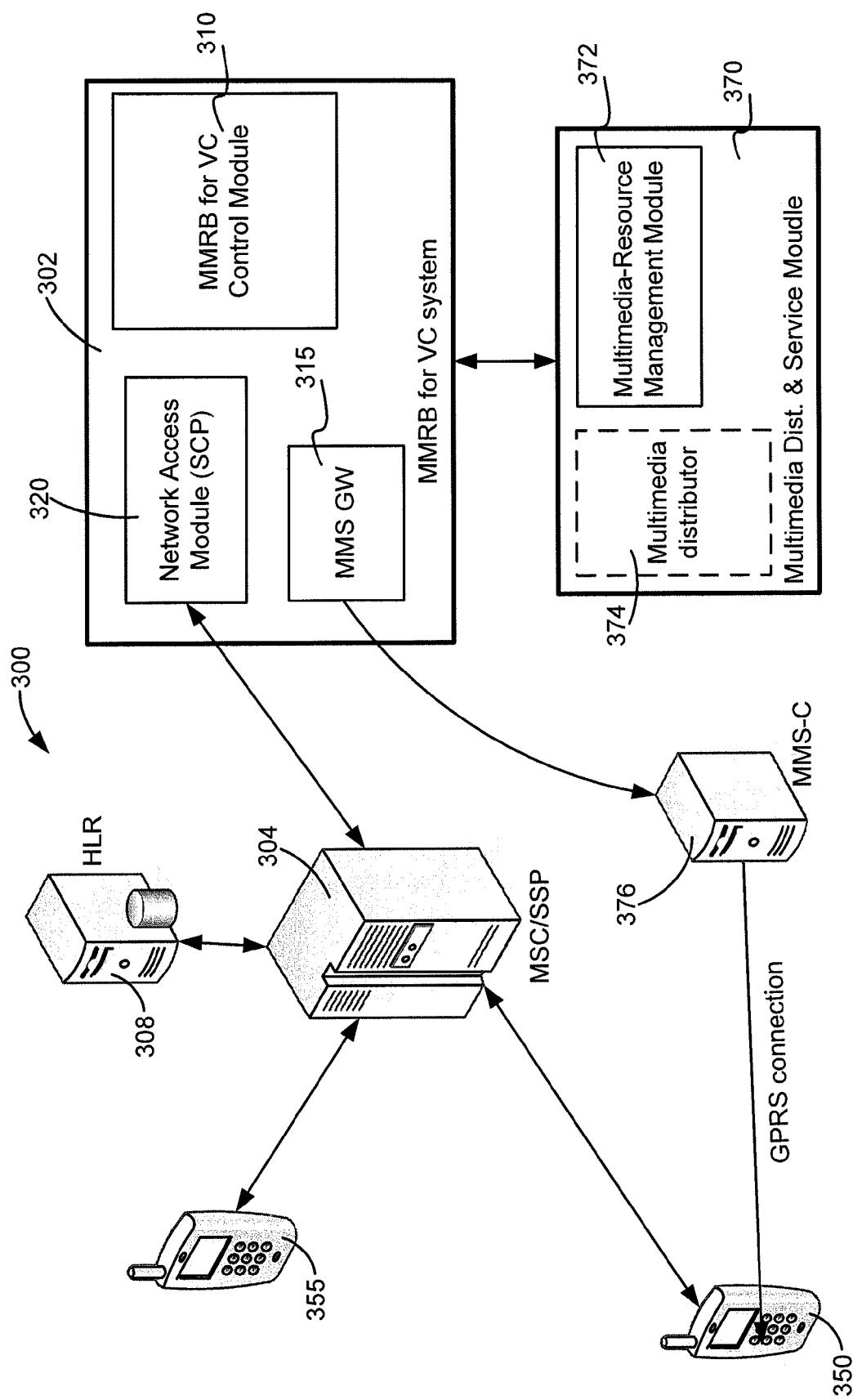
FIG. 3 is a block diagram illustration of a system according to another exemplary embodiment.

Reference is now made to FIG. 3 which is a block diagram illustration of one possible implementation of an MMRB for VC system that is compatible with communication network 300 supporting intelligent network ("IN") capabilities, according to some exemplary embodiments of the invention. According to some exemplary embodiments of the invention, a system 302 for enabling a MMRB service within the context of a voice-call may include a MMRB for VC control module 310, a network access module implemented as an SCP gateway (SCP GW) 320 and a multimedia message service ("MMS") gateway 315. In one embodiment, the system 302 may also include a multimedia-resource management module 372, however this component may be external to the system 302 as will be described below. The (SCP GW) 320 and the MMS 315 gateway may be operatively connected to the MMRB for VC control module 310. In addition, the system 302, or the MMRB for VC control module 310 integrated therein, may be operatively connected (possibly through some interface) to a multimedia distribution and service module 370 or to an external multimedia-resource management module 372.

As a non-limiting example, the MMRB for VC system 302 may be connected to a Mobile Switching Center ("MSC") or to a fixed network switch acting as a Service Switching Point ("SSP"), i.e., MSC/SSP 304, which is part of a communication network 300 supporting IN capabilities. The SCP GW 320, may provide an interface between the system 302 components and in particular the MMRB for VC control module 310 and the external network components. The SCP GW 320 may be adapted to handle all IN signaling between the components of the system 302 and MSC/SSPs 304 in the network 300. Incoming requests are translated to the internal methods of the MMRB for VC control module 310. Additionally, when the MMRB for VC control module 310 issues requests or instructions which are intended for external components in the network 300, the MMRB for VC control module's 310 internal methods may be used to approach the MSC/SSP 304, and the SCP GW 320 would translate the requests or instructions to standard IN requests or instructions and will send them to the appropriate network nodes.

In some exemplary embodiments, the MMRB for VC control module 310 may be adapted to initiate, terminate and otherwise manage an MMRB for VC service. In some exemplary embodiments, the MMRB for VC control module 310 may be implemented as an application server. The MMRB for VC control module 310 may be adapted to enable an MMRB for VC service during at least a portion of an ongoing voice-call (or voice-session) establishment process. The MMRB for VC control module 310 is configured to receive indications that correspond to certain messages from a caller 350 and to receive indications that correspond to certain messages from a callee 355, during the voice-call establishment process. The MMRB may be provided to the caller 350 concurrently with the ongoing voice-call (or voice-session) establishment process.

In some exemplary embodiments, the MMRB for VC control module 310 may invoke the MMRB for VC service in response to an event notification that corresponds to a request from a caller 350 to establish a voice-call with callee 355. In some exemplary embodiments, the event notification triggering the invocation of the MMRB for VC may be contingent upon at least one of the caller 350 or the callee 355 being subscribed to the MMRB for VC service. For clarity, it would be appreciated that in accordance with some exemplary embodiments, the subscription to the MMRB for VC may be determined outside the system 302, and prior to the initiation of the MMRB for VC service. For example, the subscription may be determined by the MSC/SSP 304 through interrogating a Home Location Register ("HLR") 308 or through interrogating a Visited Location Register ("VLR") (in case the subscriber to the MMRB for VC service is the caller 350). The MSC/SSP 304 may include an identifier of the subscriber to the MMRB for VC service within or in association with the event notification that is generated upon detection of a subscription to the MMRB for VC service, and which is, as mentioned above, intended to set-off the service.

As mentioned above, the system 302 may be operatively connected to a multimedia resource management module 372. In some exemplary embodiments, in response to invocation of the MMRB for VC service, the MMRB for VC control module 310 may retrieve a reference to a multimedia content resource (or actual multimedia content) from the multimedia resource management module 372. In some exemplary embodiments, the multimedia resource management module 372 may determine which reference to a multimedia-content resource (or actual multimedia content) to return or otherwise specify per each instance of the MMRB for VC service according to data and/or parameters received from the MMRB for VC control module 310. For example, in connection with an instance of the MMRB for VC service, the MMRB for VC control module 310 may request the multimedia resource management module 372 to provide a respective reference to a multimedia-content resource based on a network ID of the subscriber to the service, and/or based on a location (i.e. roaming status) of the subscriber, etc. According to yet a further exemplary embodiment, the system 302 may determine which reference to use at each instance of the MMRB for VC service according to predefined rules and/or defaults. The rules may be used in addition to or as an alternative of the data and parameters from the system 302. In a further exemplary embodiment, the multimedia resource management module 372 (or its functionality) may be implemented as an internal component of the system 302.

The MMS gateway 315 may interface the system 302 with MMS enabled devices, and may enable distribution of a selected multimedia resource via an MMS. For example, the MMS gateway 315 may interface the system 302 with a Multimedia Messaging Services Center ("MMSC") 376. The MMSC 376 may be utilized for delivering multimedia messages to the caller 50 and possibly to modify the multimedia content into a format suitable for the receiver, which is in this case the caller 50. It would be appreciated that according to this aspect of the invention, the MMRB for VC service can be implemented with respect to caller devices which support MMS communications. Thus, in some exemplary embodiments of the invention, MMS support on the caller 50 is a requirement.

The MMRB for VC control module 310 may provide the MMSC 376 with the network ID of the caller 350 together with the instruction to initiate the multimedia session with the caller 350. The MMRB for VC control module 310 may utilize the MMSC 376 to establish the multimedia-content communication with the caller 350 in parallel with the ongoing voice-call establishment process. In some exemplary embodiments, the MMRB for VC control module 310 may be adapted to instruct the MMSC 376 to initiate or activate the multimedia communication with the caller 350 in response to the event notification corresponding to a request (i.e. originating call attempt) from caller 350 to establish a voice-call with callee 355. According to other exemplary embodiments of the invention, the MMRB for VC control module 310 may be adapted to instruct the MMSC 376 to initiate or activate the multimedia communication with the caller 350 in response to a message indicating terminating call attempt and that the callee 555 is now pending acceptance of the voice-session. In some exemplary embodiments, the MMRB for VC control module 310 may terminate the MMRB for VC service, and may instruct the MMSC 376 to terminate the multimedia-content communication, in response to an event notification which corresponds to a message from the callee 355 indicating acceptance of the voice-call (or answering of the voice-call).

In some exemplary embodiments, the MMSC 376 may be adapted to receive further data and parameters together with the instruction to initiate the multimedia session. For example, the data from the MMRB for VC control module 310 may include the multimedia content that is to be used by the MMSC 376, or a reference to the multimedia content resource which may be used by the MMSC 376 to obtain a respective multimedia content resource and communicate it to the caller 50. In a further example, the instruction from the system 302 may provide the MMSC 376 with an indication as to the caller's 350 supported, allowed and/or preferred multimedia formats. Still further by way of example, the instruction from the system 302 may provide the MMSC 376 with an indication as to the caller's supported, allowed and/or preferred communication method.

As mentioned above, in some exemplary embodiments, the MMSC 376, the multimedia distribution and service module 370 and the multimedia resource management module 372 may be outside the scope of the invention, and any network device or service that is adapted to distribute multimedia content to a specified node (or nodes) within the network 300 may be used, including network devices and/or service which utilize the network's 300 IN capabilities.

Figure 4:
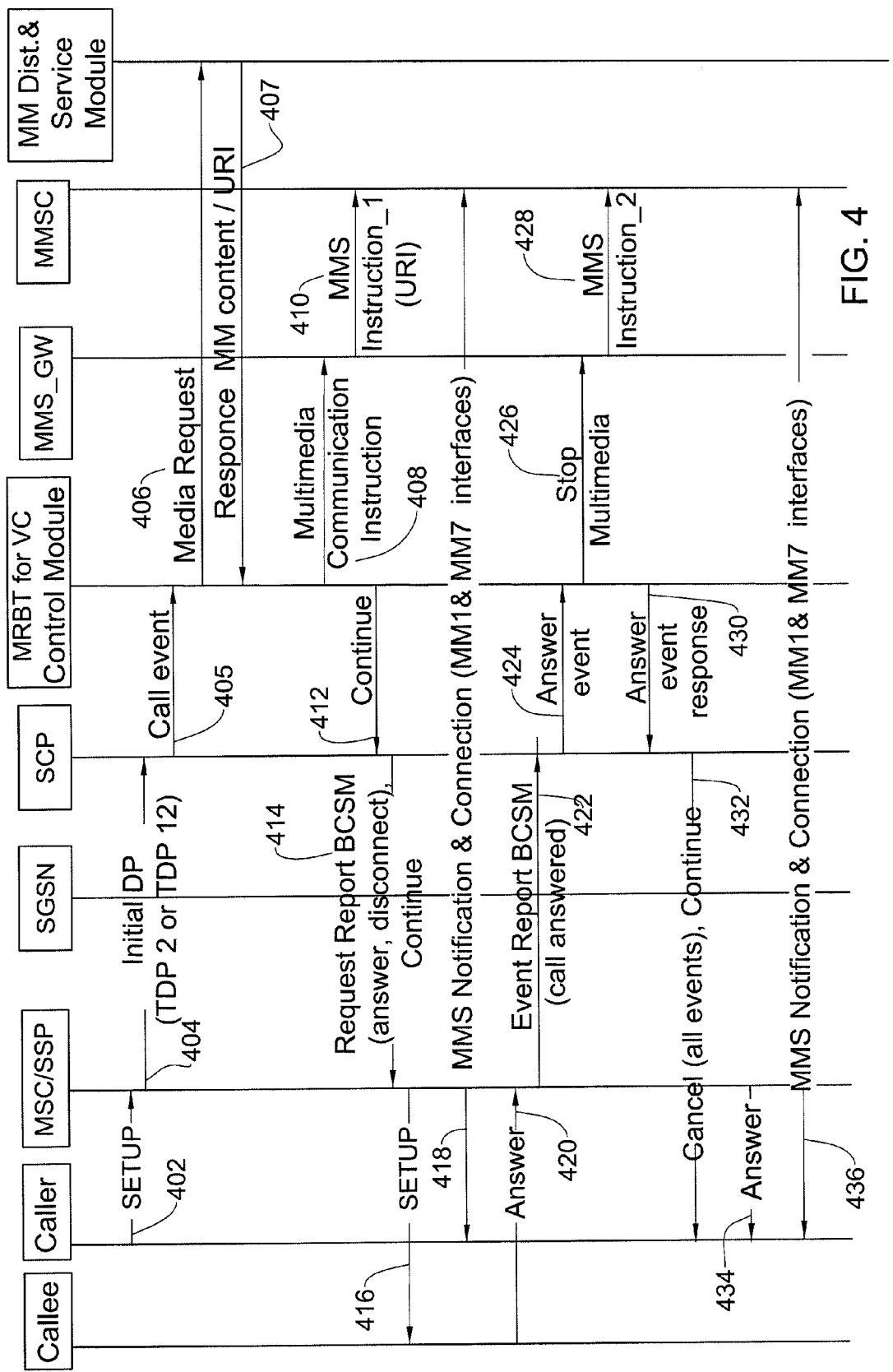
FIG. 4 is a call flow diagram according to the exemplary embodiment of FIG. 3.

Having described an exemplary embodiment of the system 302 that is compatible with a communication network supporting IN capabilities, reference is now made to FIG. 4 which is a call-flow diagram illustrating one possible implementation of a method of providing an MMRB service within the context of a voice-call within a communication network supporting IN capabilities, according to some exemplary embodiments of the invention. The call flow and the description thereof supplements the description provided above with reference to FIG. 3. The call-flow is based on CAMEL technology as defined in the following GSM and 3GPP standards:

3GPP TS 23.078—Customized Applications for Mobile network Enhanced Logic (CAMEL) Phase 2;

3GPP TS 29.078—Customized Applications for Mobile network Enhanced Logic (CAMEL) Phase 3 CAMEL Application Part (CAP) specification;

GSM 03.78—Customized Applications for Mobile network Enhanced Logic (CAMEL) Phase 2;

GSM 09.78—Customized Applications for Mobile network Enhanced Logic (CAMEL) Phase 3; CAMEL Application Part (CAP) specification The call-flow commences with a SETUP message 402 from a caller 350. As mentioned above, the SETUP message 402 is received by the MSC/SSP 304 which determines (e.g., by interrogating a respective HLR 308 or VLR) that either the caller 350 or the callee 355 (or both) is subscribed to an MMRB for VC service. Upon determining the subscription to an MMRB for VC service, the MSC/SSP 304 sends an Initial Detection Point (Initial DP) message 404 to the SCP GW 320 via CAMEL interface for service activation. The Initial DP message 404 may provide, among others, information about the callee 355, the caller 350 and the type of service that should be activated by the SCP. The Initial DP message 404 may also include information about a user's location.

The SCP GW 320 forwards an event notification (Call event request) 405 to the MMRB for VC control module 310 indicating a request from caller 350 to establish a voice-call with a callee 355 wherein at least one of the caller 350 or the callee 355 is subscribed to a MMRB for VC service. As mentioned above, the MMRB for VC module 310 may be adapted, in one exemplary embodiment, to determine which reference to use at each instance of the MMRB for VC service according to an internal or an external data resource (e.g., the multimedia resource management module 372) and based, for example, on an identifier of the respective MMRB for VC subscriber. For example, the MMRB for VC control module 310 may communicate a Media Request message 406 to a multimedia-resource management module 372 (which in the context of FIG. 4, is part of the multimedia distribution and service module 370). The process of selecting a multimedia-content resource (or which reference) in connection with an instance of the MMRB for VC service was described above in detail. The multimedia-resource management module 372 may send a Response MM media message 407 with the selected multimedia-content or with a reference (URI) to the selected multimedia-content resource.

In response to the indication 405 with respect to the voice-call establishment request, the MMRB for VC control module 310 may forward 408 through the MMS gateway 315 an Instruction or a request 410 to the MMSC 376 to initiate a multimedia communication with the caller 350. The MMRB for VC control module 310 may attach the respective URI to the request 410 as a reference to the multimedia-content resource to be communicated to the caller 350. The MMSC 376 may generate and/or format the MMS communication and may connect with the caller 350 for sending the MMS. The connection 418 to the caller 350 takes place while the voice-call establishment process continues as described below.

Following the issuance of the instruction 408 to the MMS GW 315, the MMRB for VC control module 310, sends a Continue indication 412 to the SCP GW 320 indicating that the event handler was received and requesting to continue the voice-call setup (also referred to herein as the "voice-call establishment process"). In response, the SCP GW 320 sends a corresponding Request Report BSCM message 414 followed by a Continue message (collectively referenced 414). The MMRB for VC control module 310 thus requests, using the Request Report BCSM Event (RRB) message 414 (and through the SCP GW 320) that the SSP 304 monitors call events (B-Answer, A-Abandon, B-Busy, and B-No Answer, B-Route Select Failure).

Next, the MSC/SSP 304 sends a Setup message 416 to the callee 355. As mentioned above, the MMRB may be provided to the caller 350 concurrently with the ongoing voice-call (or voice-session) establishment process. This is illustrated by the current call-flow, and in this case, the MMS notification and connection (MM1 and MM7 interfaces) 418 is received at the caller 350 shortly following (but independently from) the sending of the Setup message 416 to the callee. It would be appreciated that upon receipt of the MMS notification and connection 418 the caller 350 may begin to receive a multimedia communication (the MMRB) while the voice-call establishment process is proceeding.

Continuing with the description of the call-flow, while the caller 350 is receiving the MMRB, the callee 355 accepts the voice-call (answers the call) and communicates an Answer message 420. The MSC/SSP 304 sends and Event Report BCSM message 422 with the Answer event to the SCP GW 320. The SCP GW 320 forwards 424 the Answer event to the MMRB for VC control module 310. Upon receiving the event notification indicating the callee 355 has accepted the voice-call, the MMRB for VC control module 310 issues an instruction 426 to Stop the multimedia communication with the caller 350. In one example, the MMRB for VC control module 310 may cause the cessation of the multimedia communication with the caller 350 by including in the instruction 426 an empty URI. The MMS GW 315 forwards 428 the new MMS request to the MMSC 376 in order to remove the reference to the multimedia-content resource that was provided as part of the MMRB for VC service. In addition, the MMRB for VC control module 310 returns an Answer event response 430 to the SCP GW 320. The SCP GW 320 cancels all previously required pending events by using a CANCEL message 432 with a Continue instruction (collectively marked with 432) to the MSC/SSP 304, indicating that call setup should continue without modification.

Now that the MMRB is terminated, the MSC/SSP forwards 434 the Answer message (originally from the callee 355) to the caller 350. As a result the voice-call establishment process is complete and a voice conversation starts. Substantially concurrently with the start of the voice conversation, the multimedia communication is terminated with an MMS notification and connection (MM1 and MM7 interfaces) message 436 from the MMSC 376 to the caller 350.

Having described various exemplary embodiments of the invention which relate to an implementation of the MMRB for VC system that is compatible with a communication network supporting IN capabilities, there is now provided a description of further exemplary embodiments of the invention, which relate to a further implementation of the MMRB for VC system that is also compatible with a communication network supporting IN capabilities, and Unstructured Supplementary Service Data (USSD) in addition to IN capabilities. In the description below the standard USSD procedure is used and this implementation may be applicable to any IN-based protocols, such as CAP, INAP or WIN. It would be further appreciated that, according to some exemplary embodiments, the implementation allows to utilizing the USSD capabilities to provide a similar user experience compared to that available through the implementation shown in FIG. 3 and described above with reference thereto, without involving an MMSC.

In the following exemplary embodiments, it is assumed that the caller possibly using a client application running thereon is capable of retrieving a URI from a USSD message received thereon, and is further adapted to access or download multimedia from a multimedia resource located at the retrieved URI.

Figure 5:
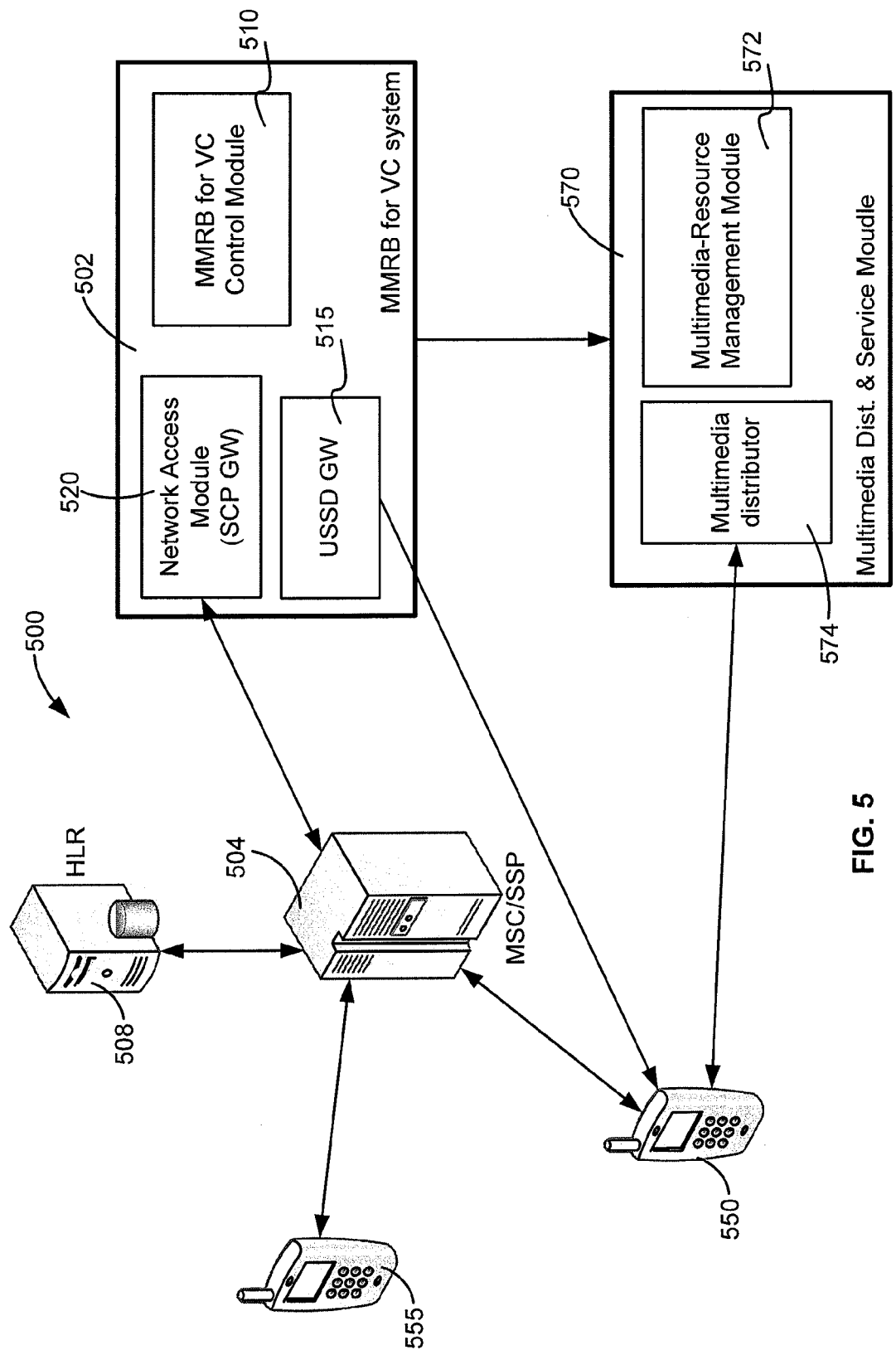
FIG. 5 is a block diagram of a system according to another exemplary embodiment.

Reference is now made to FIG. 5, which is a block diagram illustration of one possible implementation of an MMRB for VC system that is compatible with a communication network supporting IN and USSD capabilities, according to some exemplary embodiments of the invention. According to some exemplary embodiments, a system for enabling a MMRB service within the context of a voice-call, i.e., system 502 may include a MMRB for VC control module 510, a network access module (e.g., a SCP GW 520) and a USSD gateway ("USSD GW") 515. In one exemplary embodiment, the system 502 may also include a multimedia-resource management module 572, however this component may be external to the system 502, as will be described below. The SCP GW 520 may be operatively connected to the MMRB for VC control module 510.

As a non-limiting example, the system 502 may be connected to a MSC/SCP 504, which is part of a communication network 500 supporting IN and USSD capabilities. The SCP GW 520 is implemented as a SCP gateway providing an interface between the system's 502 components and the external network components.

In some exemplary embodiments, the MMRB for VC control module 510 may be adapted to initiate, terminate and otherwise manage a MMRB for VC service. In some exemplary embodiments, the MMRB for VC control module 510 may be implemented as an application server. The MMRB for VC control module 510 may be adapted to enable a MMRB for VC service during at least a portion of an ongoing voice-call (or voice-session) establishment process. The MMRB for VC control module 510 is configured to receive indications that correspond to certain messages from a caller 550 and to receive indications that correspond to certain messages from a callee 555, during the voice-call establishment process. The MMRB may be provided to the caller 550 concurrently with the ongoing voice-call (or voice-session) establishment process.

In some exemplary embodiments, the MMRB for VC control module 510 may invoke the MMRB for VC service in response to an event notification that corresponds to a request from a caller 550 to establish a voice-call with a callee 555. In some exemplary embodiments, the event notification triggering the invocation of the MMRB for VC may be contingent upon at least one of the caller 550 or the callee 555 being subscribed to the MMRB for VC service. In yet further exemplary embodiments, in response to invocation of the MMRB for VC service, the MMRB for VC control module 510 may cause a multimedia-content communication to be enabled between a multimedia distribution and service module 570 and the caller 550, in parallel with the ongoing voice-call establishment process.

In some exemplary embodiments, in response to an event notification that corresponds to a voice-call invitation from and/or to a subscriber of the MMRB for VC service, the MMRB for VC control module 510 may be adapted to utilize the USSD GW 515 to communicate with the caller 550 and to request the caller 550 to accept a data-session (or multimedia-session) connection during the ongoing voice-call establishment process. The request from the caller 550 to accept a data-session (or multimedia-session) connection may be used to enable the communication of a multimedia-content (the MMRB) to the caller 550 in parallel with the ongoing voice-call establishment process, as detailed below.

In some exemplary embodiments, the MMRB for VC control module 510 may provide or obtain a reference to a selected multimedia-content resource (or the actual multimedia-content). The MMRB for VC control module 510 may invoke a data-session request which includes a reference (e.g., a URI) to the selected multimedia-content resource. The data-session request may be communicated to the caller 550, for example through the USSD GW 515. The attached reference may enable connection to a selected multimedia-content resource that is to be played on the caller's 550 device. The selected multimedia-content resource may be hosted on a media distributor 574, and the media distributor 574 may be adapted to communicate the selected multimedia-content resource to a node within the network 500, in this case to the caller 550. In some exemplary embodiments, the caller 550 may establish the data session with the media distributor 574 according to the URI received by the caller 550 (with the data-session request), thereby enabling communication of the selected multimedia-content resource to the caller 550.

In some exemplary embodiments, the MMRB for VC control module 510 may be adapted to instruct the media distributor 574 to initiate or activate the multimedia communication with the caller 550 in response to the event notification corresponding to a request from the caller 550 to establish a voice-call with the callee 555. According to other exemplary embodiments of the invention, the MMRB for VC control module 510 may be adapted to instruct the media distributor 574 to initiate or activate the multimedia communication with the caller 550 in response to a message indicating receipt of the voice-call invitation message and that the callee 555 is now pending acceptance of the voice-session. In further exemplary embodiments of the invention, the MMRB for VC control module 510 may be adapted to instruct the media distributor 574 to terminate or stop the multimedia communication with the caller 550 in response to an indication received at the MMRB for VC control module 510 that a message indicating acceptance of the voice-call invitation message (answering the call) has been issued. Further reference to the operation of the media distributor 574 is provided below.

In some exemplary embodiments, the system 502 may be operatively connected to the multimedia distribution and service module 570. The multimedia distribution and service module 570 may include the multimedia resource management module 572 and the media distributor 574. In some exemplary embodiments, in response to invocation of the MMRB for VC service, the MMRB for VC control module 510 may provide the multimedia resource management module 572 with an indication with respect to the multimedia content that should be communicated to the caller 550. In further exemplary embodiments, in addition to information from the MMRB for VC control module 510 related to multimedia content, or as an alternative thereof, the multimedia resource management module 572 may implement some rules and additional information to determine which multimedia-content resource to use (or which reference) in connection with a certain instance of the MMRB for VC service.

In some exemplary embodiments, the multimedia resource management module 572 may process data from the 502 (and possibly data from other source, including local data) and may provide in response a reference to a specific multimedia resource (e.g., a URI), or the actual multimedia content, that is to be used for the MMRB. In one example, the multimedia-resource management module 572 may be adapted to select the specific reference to a multimedia content resource for a certain instance of the MMRB for VC service based at least on an identifier of the subscriber to the MMRB for VC service. In a further example, the multimedia resource management module 572 may determine which media content is to be used for the MMRB according to an indication from the MMRB for VC control module 510 with respect to the caller's 550 supported, allowed and/or preferred multimedia formats and according to an indication with respect to the supported, allowed and/or preferred communication method vis-à-vis the caller 550. It would be appreciated that according to some exemplary embodiments of the invention, information related to the caller 550 and/or the callee 555 may be obtained by the MMRB for VC control module 510 through an Initial Detection Point (Initial DP) message received from the MSC/SSP 504 in response to the request from the caller 550 to establish a voice-call with the callee 555. In further exemplary embodiments, the multimedia resource management module 572 may implement predefined rules (in addition to or as an alternative to any other information) to determine the multimedia content resource that is to be used in connection with an instance of the MMRB for VC service. In still further exemplary embodiments, the MMRB for VC control module 510 may provide the multimedia distribution and service module 570 with a reference to a multimedia resource that is to be used in connection with a certain instance of the MMRB for VC service.

As mentioned above, once the multimedia-content resource (or the reference thereto) is determined, the MMRB for VC control module 510 may utilize the USSD GW 515 to transmit a USSD request to the caller 550 with the selected URI, whereby the caller 550 is requested to establish a data-session (or multimedia-session) connection according to the URI included or associated with the USSD request. The URI in the USSD request may reference a multimedia-content resource hosted on the media distributor 574. Thus, the caller 555 may connect to the media distributor 574 using the URI included in the USSD request and thereby engage in a multimedia communication with the media distributor 574. The multimedia communication (the MMRB) with the media distributor 574 may take place during the ongoing voice-call establishment process.

Figure 6:
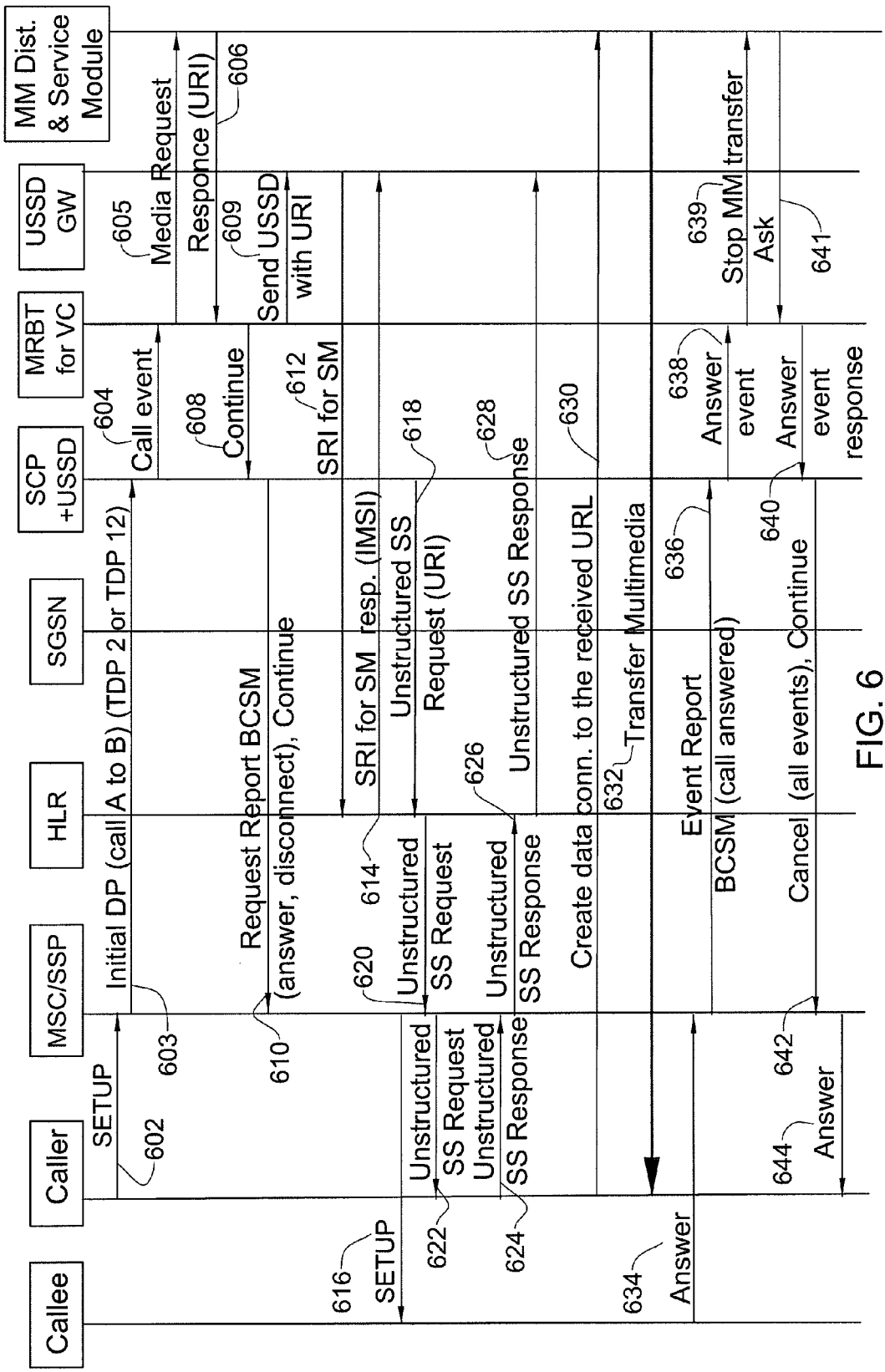
FIG. 6 is a call flow diagram according to the exemplary embodiment of FIG. 5.

Reference is now made to FIG. 6, which is a call-flow diagram illustrating one possible implementation of a method of providing a MMRB service within the context of a voice-call in a communication network supporting IN and USSD capabilities, according to some exemplary embodiments of the invention. The call flow and the description thereof supplements the description provided above with reference to FIG. 5. The call-flow is based on CAMEL technology as defined in the standards mentioned above and the USSD technology as defined in the following GSM and 3GPP standards:

GSM 09.02—Digital cellular telecommunications system (Phase 2); Mobile Application Part (MAP) specification;

3GPP 29.002—3rd Generation Partnership Project; Technical Specification Group Core Network; Mobile Application Part (MAP) specification;

GSM 03.90—Digital cellular telecommunications system (Phase 2+); Unstructured Supplementary Service Data (USSD)—Stage 2; and 3GPP 23.090—3rd Generation Partnership Project; Technical Specification Group Core Network; Unstructured Supplementary Service Data (USSD)—Stage 2

The call-flow commences with a Setup message 602 from caller 550. The Setup message 602 is received by the MSC/SSP 504 which determines (e.g., by interrogating a respective HLR 508) that either the caller 550 or the callee 555 (or both) is subscribed to a MMRB for VC service. Upon determining that either the caller 550 or the callee 555 is subscribed to a MMRB for VC service the MSC/SSP 504 sends Initial Detection Point (Initial DP) message 603 to the SCP GW 520 that is part of or that is associated with the 502 via CAMEL interface.

The SCP GW 520 forwards an event notification (Call event) 604 to the MMRB for VC control module 510 indicating a request from caller 550 to establish a voice-call with callee 555 where at least one of the caller 550 or the callee 555 is subscribed to an MMRB for VC service. As mentioned above, an indication a caller 550 is requesting to establish a voice-call with a callee 555 where at least one of the caller 550 or the callee 555 is subscribed to an MMRB for VC service may cause the MMRB for VC control module 510 to invoke the MMRB for VC service. In response to invocation of the MMRB for VC service, the MMRB for VC control module 510 may communicate a Media Request 605 to the multimedia distribution and service module 570, for retrieving from the multimedia-resource management module 572 a reference (e.g., a URI) to a selected multimedia-content resource. The multimedia-resource management module 572 may select the appropriate multimedia-content resource (reference) and may send a Response message 606 with the selected reference to the MMRB for VC control module 510.

Further in response to the indication that caller 550 is requesting to establish a voice-call with callee 555 where at least one of the caller 550 or the callee 555 is subscribed to an MMRB for VC service, the MMRB for VC control module 510 may send a Continue message 608 to the SCP GW 520 instructing the continuation of the call processing. In response to the Continue message 608 from the MMRB for VC control module 510, the SCP GW 520 sends RRB message 610 with answer, disconnect and abandon notification events and a Continue message (collectively referenced 610) to the MSC/SSP 504. Thus, the SCP 520 is requesting the MSC/SSP 504 to monitor events (e.g., B-Answer, A-Abandon, B-Busy, and B-No Answer, B-Route Select Failure) with one or more Request Report BCSM Event (RRB) operations (one RRB may be used to arm multiple events). The MSC/SSP 504 then sends a Setup message 616 with the details of the voice-call that the caller 550 is seeking to establish with the callee 555.

In response to receipt of the Response message 606 with the selected reference the MMRB for VC control module 510 issues a "Send USSD" with URI instruction 609 to the USSG GW 515. In response to the instruction 609, the USSD GW 515 creates a USSD Application originated session by sending Send Routing Info for SM message 612 to the HLR 508 and receiving back from the HLR 508 Send Routing Info for SM response message 614. Through the technical messages 612 and 614 exchanged between the USSG GW 515 and the HLR 508, the USSD GW 515 obtains information that is necessary to send USSD messages to the caller 550.

During the ongoing voice call establishment process, the USSD GW 515 communicates an Unstructured Supplementary Service Request (USSR) message 618 including a reference to the selected multimedia resource to the HLR 508. In some exemplary embodiments, the MMRB for VC control module 510 instructs the USSD GW 515 to send the USSR request message 618 only after an indication is received that the voice-call invitation message was received and that the callee 555 is now pending acceptance of the voice-session.

The USSR request message 618 may reference a multimedia-content resource that is hosted on the media distributor 574. In message 620, the HLR 508 forwards the USSR request message to the MSC/SSP 504, which in turn, in message, 622, forwards the USSR request message to the caller 550. The USSR message enables initiation of a session in between the media distributor 574 and the caller 550. The USSR message can be used to provide session based services by providing the caller 550 with a URI referencing a multimedia-content resource, which the caller 550 may use to establish a multimedia session.

Following receipt of the USSR message 622, the caller 550 returns a USSR response 624 to the MSC/SSP 504, which in turn forwards 626 the USSR response to the HLR 508. The HLR 508 communicates 628 the USSR response to the USSD GW 515.

Moving on with the description of the call flow, the caller 550 may now create a data connection 630 with the multimedia distribution and service module 570, or with the multimedia distributor 574 integrated therein, according to the URI received via the USSR messages 618-622. The URI may reference a multimedia-content resource hosted on or otherwise available to the multimedia distributor 574, and the multimedia distributor 574 may thus transfer the selected multimedia 632 to the caller 550.

In parallel with the initiation of the MMRB for VC service, the voice-call establishment process proceeds, and an Answer message 634 may be issued by the callee 555 indicating that the callee 555 has accepted (answered) the voice-call. The Answer message 634 is received at the MSC/SSP 504, and the MSC/SSP 504 indicates 636 to the SCP GW 520 that the callee 555 has accepted the call. The SCP GW 520 sends a message 638 to the MMRB for VC control module 510 to indicate the answer event. In response, the MMRB for VC control module 510 communicates a Stop multimedia transfer message 639 to the service module 570, which causes the multimedia distributor 574 to terminate the multimedia session with the caller 555 or otherwise stop the transfer of multimedia-content.

Further in response to the receipt of an indication on the MMRB for VC control module 510 that the callee 555 issued an Answer message 634, the MMRB for VC control module 510 sends an Answer event response message 640 to the SCP 520. The SCP 520 sends a Cancel message 642 instructing the MSC/SSP 504 to cancel all events with Continue message (collectively referenced 642) for instructing MSC/SSP 504 to continue with the voice-call setup (also to referred to herein as the "voice-call establishment process"). It would be appreciated that the Cancel message 642 terminates the CAMEL transaction without call interruption. Finally the voice-call establishment process is complete and a voice conversation starts with an Answer message 644 from the MSC/SSP 504 to the caller 550.

It would be appreciated that the proposed implementation is applicable to any IN-based protocol, such as CAP, INAP or WIN.

Having described various implementations of the present invention in which various standard network capabilities are used to enable and provide the MMRB for VC service in the context of a voice call, and in particular in parallel with the ongoing voice-call establishment process, there is now provided a description of another exemplary embodiment of the present invention, which relates to an implementation of a MMRB for VC system that is adapted to cooperate with a client application running on a voice-call party to enable an MMRB during a voice-call establishment process. The MMRB for VC system may be implemented over various network environments, and in particular communication networks. In a non-limiting embodiment, the client application runs on the caller.

Figure 7:
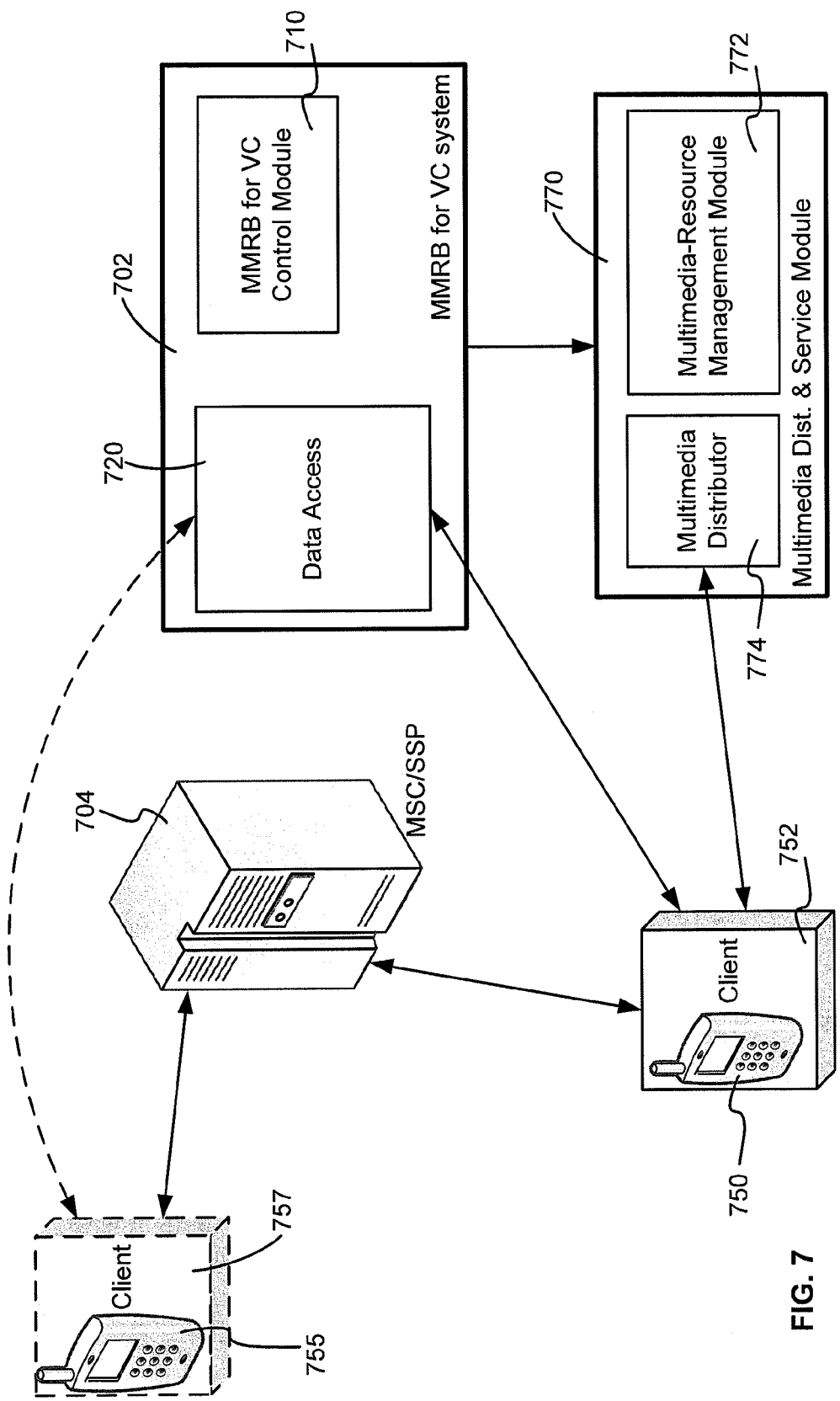
FIG. 7 is a block diagram of a system according to another exemplary embodiment.

Reference is now made to FIG. 7 which is a block diagram illustration of one possible implementation of an MMRB for VC 702 that is adapted to cooperate with a client application running on voice-call party to enable an MMRB during a voice-call establishment process, according to some exemplary embodiments of the invention. In FIG. 7 and in the description of FIG. 7 provided below client application 752 runs on caller 750, in accordance with some exemplary embodiments of the invention. However, it would be appreciated that in further exemplary embodiments, the MMRB for VC system 702 may be implemented in conjunction with a client application 757 running on callee 755. Those of ordinary skill in the art may readily adapt and modify the description provided herein to enable the MMRB for VC system 702 to cooperate with a client application 757 running on the callee 555 to enable a MMRB during a voice-call establishment process.

According to some exemplary embodiments, an MMRB for VC system 702 may include an MMRB for VC control module 710 and a data access module 720. The data access module 720 may be operatively connected to the MMRB for VC control module 710. The data access module 720 may provide an interface between the MMRB of VC 702 components and in particular the MMRB for VC control module 710 and the external client application(s) 752 and 757. By way of a non-limiting example, the MMRB for VC system 702 may be operatively connected to a multimedia distribution and service module 770. The interaction between the MMRB for VC system 702 and the multimedia service and distribution module 770 shall be described in further detail below.

According to some exemplary embodiments, a voice call establishment process may be initiated by caller 750. The caller 750 may initially transmit an Invitation message whereby a callee 755 is invited to establish a voice-call session with the caller 750. In some exemplary embodiments, the Invitation message, as well as other voice-call establishment messages, may be routed through a MSC/SCP 704. At some point during the voice-call establishment process an Alerting message may be received on the caller 750. An Alerting message is a message indicating receipt of the invitation message and that the callee 755 is now pending acceptance of the voice-call.

According to some exemplary embodiments, the client application 752 may be configured to invoke a network reference which is predefined on the client application 752 in order to establish communication with the MMRB for VC system 702, for example, through the data access module 720. According to further exemplary embodiments, the client application 752 may be adapted to monitor certain (and possibly all) incoming and certain (and possibly all) outgoing session establishment messages, and in particular voice-call establishment messages. In some exemplary embodiments, in response to an indication with respect to an Alerting message being received on the caller 750 and contingent upon the caller 750 being subscribed to the MMRB for VC service, the client application 755 may provide the MMRB for VC system 702 with call requisite information, such as an identifier or the caller 750 and/or the callee 752, MMRB for VC subscription information, the caller's 750 location, supported and/or preferred communication formats, supported and/or preferred multimedia formats, identifiers of supported and/or preferred content, etc. The client application 752 may request the MMRB for VC system 702 to provide a reference to a multimedia-content resource to be used as the MMRB during the ongoing voice-call establishment process. It would be appreciated that in case the invention is implemented using a client application 752 which runs on the callee 755, the communication with the MMRB for VC 702 may be contingent upon the callee 755 being subscribed to the MMRB for VC service.

According to some exemplary embodiments, the client application 752 may hold a network reference to the MMRB for VC system 702 and may use it to establish a communication link with the MMRB for VC system 702. The communication may be generated on an ad-hoc basis, for example, in response to a request from client application 752 that is triggered by an indication with respect to an Invite/Alerting message, or the link may be substantially permanent, as long as the application 752 is running, for example.

In some exemplary embodiments, the MMRB for VC control module 710 may be adapted to facilitate the MMRB for VC service. In further exemplary embodiments, the MMRB for VC control module 710 may be adapted to provide the client application 752 with certain data that is required in order for the client application 752 to be able to establish the multimedia session for receiving the MMRB. For example, the MMRB for VC control module 710 may provide the client application 752 with a reference to a multimedia-content resource, as will be described below. In a further example, the MMRB for VC control module 710 may provide the client application 752 with an encryption or decoding key that is necessary in order to access or playback a multimedia-content resource.

According to some exemplary embodiments, in response to a certain communication from the client application 752 (e.g., an appropriate request), the MMRB for VC control module 710 may be adapted to communicate with the multimedia distribution and service module 770. The MMRB for VC control module 710 may be adapted to request the multimedia distribution and service module 770 to provide a reference to a multimedia-content resource. The multimedia distribution and service module 770, or possibly, a multimedia-resource management module 772 residing thereon, may be adapted to select a multimedia-content resource and respond to the request from the MMRB for VC control module 710 with a respective reference (e.g., URI). The process of selecting the multimedia-content resource was described in detail above and may be implemented here mutatis-mutandis. As was also mentioned above, the multimedia distribution and service module 770 and/or the multimedia-resource management module 772 may be implemented as part of the MMRB for VC system 702.

According to some exemplary embodiments, the MMRB for VC control module 710 may be adapted to provide the client application 752 with the reference to a certain multimedia-content resource that is to be used as a MMRB, and/or with another which is required to facilitate or enable the MMRB, in response to an appropriate instruction from the client application 752. The client application 752 may be adapted to trigger the communication with the MMRB for VC control module 710 and in particular the request for certain information that can be used to facilitate the MMRB in response to an alerting message received from the callee 755, where at least one of the caller 750 and/or the callee 755 is subscribed to the MMRB for VC service. In further exemplary embodiments, the client application 752 may be adapted to trigger the communication with the MMRB for VC control module 710 in response to an initiation message issued by the caller 750. In these exemplary embodiments, the client application 752 may hold or suspend the connection to the multimedia-content resource referenced by the MMRB for VC control module 710 until an Alerting message is received. It would be appreciated that, the voice-call establishment process is not complete when the MMRB service is initiated or activated, and that the MMRB for VC may thus be initiated and activated during the ongoing voice-call establishment process. It would be further appreciated, that the multimedia-session with the client application 752 running on the caller 750 does not substantially interfere with the ongoing call establishment process between the caller 750 and the callee 755.

As mentioned above, according to some exemplary embodiments of the invention, the MMRB for VC system 702 may be operatively connected to multimedia resource distribution and service module 770. As was also mentioned above, the multimedia distribution and service module 770 may include multimedia resource management module 772. The interaction with the multimedia resource management module 772 was described above. The multimedia distribution and service module 770 may also include a multimedia distributor 774. In some exemplary embodiments, in response to invocation of the MMRB for VC service, the MMRB for VC control module 710 may instruct the multimedia distribution and service module 770, or the multimedia distributor 774 integrated therein, to establish a multimedia communication with the client application 752. In further exemplary embodiments of the invention, following the initiation or activation of the MMRB for VC service by the client application 752, the client application 752 may connect to the multimedia distributor 774, for example, using a URI received from the MMRB for VC control module 710. Further by way of example, the URI received from the MMRB for VC control module 710 may reference a multimedia-content resource hosted on multimedia distributor 774.

Figure 8:
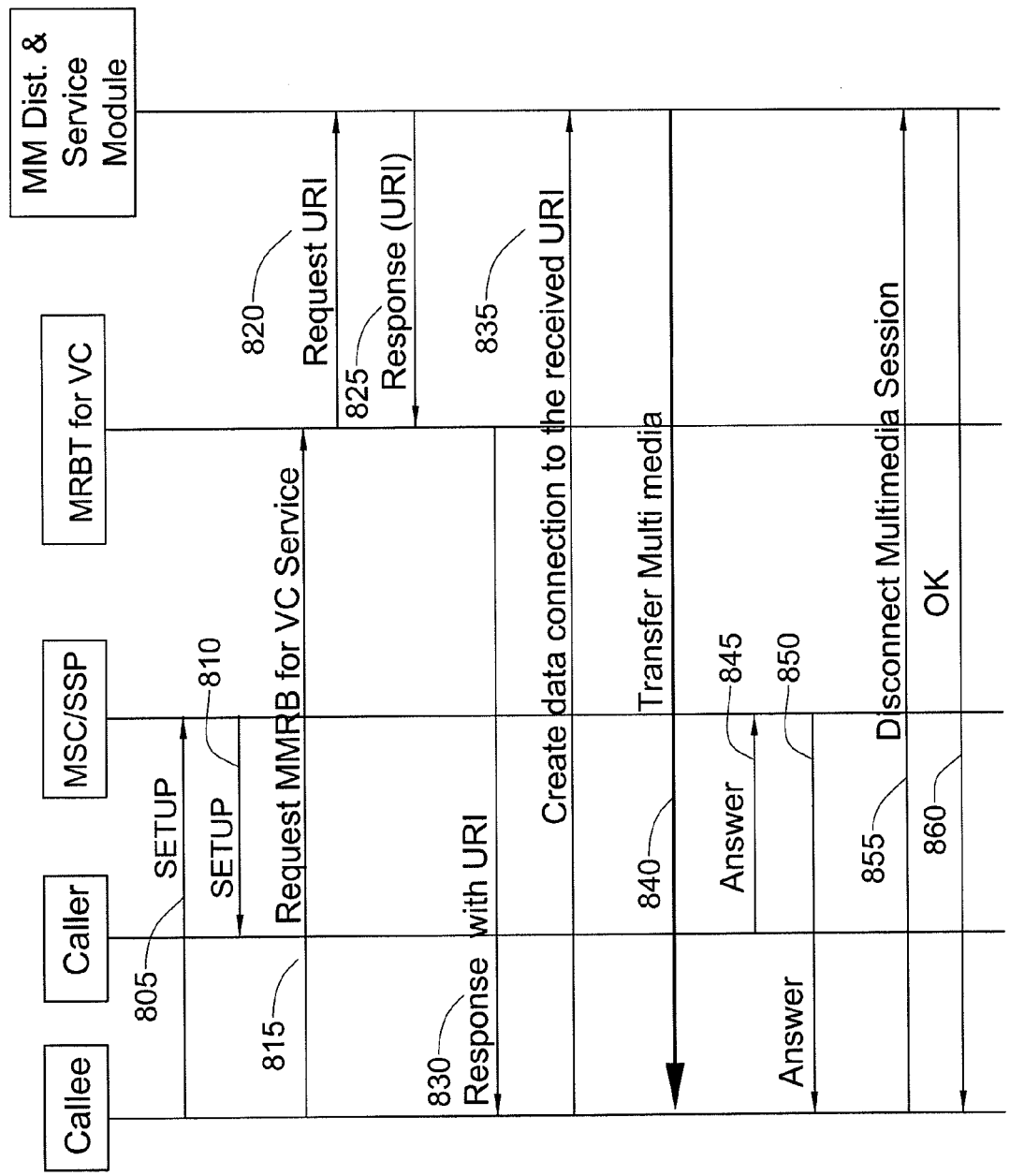
FIG. 8 is a call flow diagram according to the exemplary embodiment of FIG. 7.

Reference is now made to FIG. 8, which is a call-flow diagram illustrating one possible implementation of a method of providing an MMRB service within the context of a voice-call using a client application, according to some exemplary embodiments of the invention. For convenience, the call-flow shown in FIG. 8 and described herein with reference thereto, relates to one implementation according to some exemplary embodiments of the invention, where the client application 752 is implemented on the caller device 750. However, in other exemplary embodiments of the invention, the client application 757 may be implemented on the callee device 755. Those of ordinary skill in the art may readily adapt and modify the description provided herein to enable the method of providing an MMRB within the context of a voice-call to a callee based client application scenario.

The call-flow commences with a voice-call Setup message 805 from the caller 750. The Setup message 805 is the message whereby the caller 750 invites the callee 755 to join the voice-call session with the caller 750. The Setup message 805 is a communication to the MSC/SSP 704, which forwards the message 810 to the callee 755. According to some exemplary embodiments, at this point, the caller 750 may send a Request MMRB for VC service message 815 to the MMRB for VC system 702 or to the MMRB for VC control module 710 integrated therein, for invoking the MMRB for VC service.

Upon receipt of the Request MMRB for VC service message 815, the MMRB for VC system 702 may communicate a Request URI message 820 to a multimedia distribution and service module 770. The Request URI message 820 may include data that is related to the current instance of the MMRB for VC service, such as, for example, the network ID (or other unique ID) of the subscriber to the MMRB service. Other types of the data which may be provided include, but are not limited to: the caller's 750 location, supported and/or preferred communication formats, supported and/or preferred multimedia formats, identifiers of supported and/or preferred content, etc. The multimedia distribution and service module 770 may respond to the request with a Response message 825 which includes or is associated with a selected URI (or other reference). The MMRB for VC system 702 may communicate a response message 830 to the caller 750 (responsive to the Request MMRB for VC service message 815). The Response message 830 may include the URI selected by the multimedia distribution and service module 770 and possibly other data that is required in order for the client application 752 to be able to establish the multimedia session for receiving the MMRB. For example, an encryption or decoding key that is necessary in order to access or playback of a multimedia-content resource referenced in the Response message 830.

According to some exemplary embodiments of the invention, upon receipt of the Response message 830 with the URI and possibly other data that is required in order for the client application 752 to be able to establish the multimedia session for receiving the MMRB, the client application 752 may create a data connection to the referenced multimedia-content resource 835, for example, using the selected URI, giving rise to a MMRB playing on the caller device 750 during the ongoing voice-call establishment process. In further exemplary embodiments, the client application 752 may suspend the connection to the multimedia-content resource (and thus the MMRB), until the caller 750 receives an Alerting message indicating receipt of the Invitation message (or Setup message) 810 and that the callee 755 is now pending acceptance of the voice-call.

As mentioned above, the reference provided to the client application 752 may facilitate connection to a multimedia-content resource hosted on a multimedia distributor 774 which is part of the multimedia distribution and service module 770. Once the client application 752 is connected to the multimedia distribution and service module 770, or to the multimedia distributor 774 integrated therein, a multimedia-session may be activated and the multimedia distributor 774 may transfer multimedia 840 to the client application 752 on the caller 750, giving rise to an MMRB which is played on the caller 750 during the ongoing voice-call establishment process.

At some point during the ongoing voice-call establishment process, the callee 755 may accept the invitation from the caller 750 to establish a voice-call (answer the call) and may communicate an Answer message 845 to the MSC/SSP 704. In response, the MSC/SSP 704 forwards 850 the Answer message to the caller 750. With the receipt of the Answer message 850 on the caller 750 the voice-call is established. Thus, further in response to receipt of the Answer message 850 from the MSC/SSP 704 on the caller 750, the client application 750 may send a Disconnect multimedia-session (or data-session) message 855 to the multimedia distribution and service module 770. The Disconnect message 855 is responded to with an Acknowledgement message 860 from the multimedia distribution and service module 770, thereby terminating the MMRB. The MMRB for VC control module 710 may also be notified about the termination of the MMRB.

Various exemplary embodiments of the invention may be implemented in various configurations to provide a MMRB for VC service to users of a communication network. According to one embodiment, the MMRB for VC service may be used to provide multimedia content to a caller during an ongoing voice-call establishment process. In some exemplary embodiments, the multimedia content communication is terminated or discontinued when the callee answers the call and the voice-call begins. There is now provided a description of some aspects of the invention which relate to the manner by which the MMRB for VC is configured and provided to the caller. Unless specifically stated otherwise, the following aspect of the invention is applicable to all of the implementations of the MMRB for VC system described above, and can be implemented in conjunction with the various multimedia distribution and service modules that were also described above.

According to some exemplary embodiments, once a user of the network subscribes to the MMRB for VC service, the MMRB for VC system may indicate the subscription of the user to the network components which record network users' service subscriptions, such as an HLR or an HSS. Recordation of the subscription with the network's services recordation entity may enable forwarding of indications with respect to pertinent session establishment messages according to the users' service subscriptions, and in particular, according to a user's subscription to the MMRB for VC service.

The operator of the MMRB for VC system and of the associated components, including, for example, the multimedia distribution and service module, may enable network users to subscribe to the MMRB for VC service. The operator of the MMRB for VC system and of the associated components may enable subscribers to the MMRB for VC service to personalize the multimedia content that is to be provided as the MMRB in connection with a subscriber's ongoing voice-call establishment process. As part of the subscription to the service, the operator may enable subscribers to purchase certain multimedia content that is to be used as an MMRB for a voice-call where the subscriber is the caller or the callee (in the later case, the MMRB may be presented to the other party, i.e., the caller).

Once a subscriber purchases a certain multimedia content for being used as a MMRB, the association between the MMRB for VC service subscribed and the specific multimedia content may be recorded. For example, in one embodiment, a record with respect to the subscriber's selected multimedia content may be recorded on a data repository that is part of the MMRB for VC system. In a further embodiment, the record with respect to the subscriber's selected multimedia content may be recorded outside the MMRB for VC system. In case an external repository is used, the MMRB for VC system may enable selection of the appropriate multimedia content by providing the external repository with the necessary data and parameters, including for example, an identifier of the MMRB for VC service subscriber. The source of the multimedia content that is to be used in connection with an instance of the MMRB for VC service may be any one of the following: preloaded multimedia content stored on the subscribers' multimedia content repository (whether internal or external); a URL or other reference pointing towards an external content provider/supplier; and uploaded content, for example, in case of subscriber-generated content. The content can be purchased through a variety of storefronts: operator storefront, for example: via Web UI through fixed or mobile devices, SMS/MMS UI, IVR UI, WAP through mobile device UI, through 3rd party storefronts, such as external web sites or operator or 3rd party Web applications such as Messenger or Web album.

According to some exemplary embodiments, once a certain multimedia content item is purchased, the subscriber to the service may request to define, either through a mobile device or through any other supported communication device (e.g., a computer), the media content item as his (or someone else's—a beneficiary) MMRB. Upon receiving a request from a subscriber to set a certain authorized multimedia-content resource as a MMRB for VC, the relevant data on the HSS/HLR/VLR and/or on the MMRB for VC or on any other database or registry component in the network may be updated so as to enable the use of the multimedia-content resource in the context of either incoming or outgoing calls associated with the subscriber. For outgoing related service, a client application is also applicable in which the subscription data is not updated in a network component but instead is delivered by the subscriber itself (e.g., the caller using a client application) and the MMRB for VC system identifies that the particular user is subscribed to the service by extracting the relevant data from the signaling protocol traffic sent out by the subscriber.

As mentioned above, in addition to the content provisioned by the operator or by a third party, or as an alternative thereto, the multimedia content can be created by the Subscriber. The multimedia-content may be a picture or a video shot by the subscriber or some related hardware. Once the multimedia-content resource is selected it may be activated as an MMRB in a similar manner to that which was described above with reference to the purchase content.

According to a further exemplary embodiments, multimedia-content resource that is used as an MMRB may be associated with a commercial agreement between the subscriber and any mobile or fixed line operators or any other commercial entity. For example, there may be several possible types of commercial engagements between an Operator and a subscriber.

I. According to a first model, a subscriber is charged a monthly (or any other period) service subscription fee and in addition, the subscriber may be charged for each multimedia-content item acquired (either a fixed price or according to some differential pricing scheme or policy).

II. According to a second model, a subscriber may be charged only for multimedia-content items acquired for a limited period (monthly or any other period) with no service subscription charge.

III. According to a further model, a subscriber is charged only for a (monthly or any other period) subscription fee and is not charged for the multimedia-content (e.g. the content is user generated, operator content, or 3rd party owned content).

IV. According to yet another model, the multimedia-content and/or the service is sponsored by the operator in order to encourage people to use the service (in a promotion period) or marketed as part of a larger service bundle (e.g. 1000 Voice Minutes+500 SMS+RBM for $30 a month).

According to further exemplary embodiments, in another implementation of the MMRB for VC service, the operator may use the MMRB for VC service for delivering multimedia advertisements to the operator's subscribers. The operator can use the MMRB for VC service to deliver certain content to the subscribers' screens. Provided below are several possible types of commercial engagements between operator and subscribers.

I. A subscriber is credited or rebated in return for the subscriber's consent to be exposed to advertisements on his device as an MMRB played during an ongoing voice-call establishment process where the subscriber is the caller. In this case the subscriber can be the caller party in an "outgoing" service mode or the callee party in the "incoming" service mode. In some exemplary embodiments, the charge or the amount of credit which is awarded to the user may be fixed or may be based upon one or more measurable parameters which are related to the multimedia content that is provided to the subscriber and/or based on an interaction by the subscriber in response to the advertisement(s).

The MMRB for VC system may monitor and record various events and parameters related to the MMRB for VC service. The data may be analyzed by an appropriate billing module at any time to perform the relevant calculations for the credit or rebate that a subscriber is entitled to, according to any relevant usage measurement.

II. The MMRB for VC service as an advertisement service can be either an opt-in or an opt-out service. In an opt-out scenario all subscribers are provisioned to the service and are exposed to advertisements as MMRB for VC by default. Only those who prefer not to continue, unsubscribe from the service. In an opt-in scenario, all subscribers are not provisioned to the MMRB for VC service by default and those who prefer to be exposed and gain the benefits of the service can choose to subscribe.

According to a further embodiment, an MMRB for VC service may be used to provide an interactive advertisement during the voice-call establishment process. According to proposed interactive advertisement implementation, the return channel (upstream) of the caller may be used to enable communication of feedback and other responses from the caller related to the MMRB played on the caller during the voice-call establishment process. For example, the multimedia-content resource may include embedded references and triggers or event handlers for triggering the embedded references. Thus, for example, the caller may click an area of the display for example to connect to a Web/WAP Internet site to request further details about some of the multimedia content presented to the caller. According to some exemplary embodiments of the invention, through the MMRB for VC service, a caller may be presented with advertisements which are selected for that user according to the caller's profile and/or according to the call context. The profile may include, for example, personal information associated with the caller, (including but not limited to demographic information and usage habits), call related profiles and communication session related profiles. The context may include, for example, the current location of the caller and usage of other services such as browsing in any type/category of web-site.

According to one embodiment of the invention, the advertisements may be selected from a pool of advertisements. The advertisements within the pool may be associated with commercial entities with which the operator has some agreement. For example, according to one embodiment, in accordance with the agreement between the operator and the advertiser, the operator may be entitled to a certain commission per each item purchased (or some percentage of the transaction sum) through the advertisement provided to the caller via the MMRB for VC. According to a further embodiment of the invention, the operator may incentivise the caller to initiate or to execute a transaction through an advertisement provided to the caller via the MMRB by offering a rebate or a discount or some other incentive/credit. The rebate, discount and any other incentive or credit may be provided in return for the caller's initiation authorization or initiation of the MMRB for VC service and/or in return for interaction or execution of a transaction in connection with the MMRB. For example, the incentive may be awarded in case the caller followed a link embedded within the advertisement and initiated or executed a transaction with the vendor at the network address or domain to which the caller was directed by the link. According to a further embodiment of the invention, the incentive may take on some form of revenue sharing with the operator.

In further exemplary embodiments of the invention, the MMRB for VC service may provide a caller with a reference to various resources which are related to the multimedia-content presented to the caller during the voice-call establishment process. It would be appreciated that, in many cases, the duration of the voice-call establishment process is approximately between 10 to 20 seconds until the callee answers the call. In many cases, this duration may be long enough to deliver a multimedia advertisement but it may be not enough to fully communicate all the information and create the full impression which the provider of the multimedia-content resource is interested in conveying. There is also not enough time to receive feedback, in particular relatively complex feedback, or to properly respond to the multimedia content (e.g. inquire for more details and/or purchase the product/service). Thus, the MMRB for VC service may provide a caller with a reference to various resources which are related to the multimedia-content presented to the caller during the voice-call establishment process, and the references may be available to the caller on completion of the call. The references may be implemented using click to recall/press to recall concepts. It would be appreciated that incorporating the click to recall/press to recall concepts may enable the caller, after being exposed to multimedia advertisements via the MMRB for VC service to recall the advertisement after completing the voice-call which is preceded by the MMRB and continue to follow up on the advertisement. According to another exemplary embodiment, when a MMRB is played on the caller, interactions with the multimedia-content (e.g., clicking on a link to an Internet resource related to the MMRB-content) may be serviced after the voice-call, which was preceded by the MMRB, is complete.

The above implementation may be implemented according to two different scenarios:

I. The first occurs when during a voice-call establishment process a caller may issue a request for further reference in connection with some object, or item related to the MMRB or to some part thereof and the request is recorded. When the voice-call is ended the references are presented to the caller and may thus be invoked following the completion of the voice-call. In some exemplary embodiments, when a certain object or item is referenced, the MMRB for VC system may be notified. The reference may be invoked by pressing a predefined key or any key (on a alphanumeric device keypad) or through a soft-key selection or in response to a click on a touch screen and any other predefined interaction with any other UI. The call setup process continues as usual and the voice is held regularly as planned. Once the call ends and the caller references are invoked, the caller can follow up on the advertisement/MMRB content In this scenario, during an ongoing voice-call establishment process, the caller is presented with some MMRB and utilizes a GUI to request further reference to (indicate interest in) one or more objects or items within the MMRB or a reference to the MMRB as a whole. This interaction causes a SIP Info message to be sent to the MMRB for VC system. The Info message notifies the MMRB for VC control module (the application business logic module), of the caller interest. The MMRB for VC control module services the caller's interest after the voice-call is terminated.

The second occurs when, during an ongoing voice-call establishment process, the caller is presented with some MMRB but does not interact with it. However, after the respective voice-call has ended, the caller is interested in the multimedia-content resource that was presented as MMRB. The caller may generate a respective indication, possibly through a UI (a predefined hardware key sequence or a menu command) to request the MMRB. The request may be communication of the MMRB for VC and may be serviced. Upon receipt of the request multimedia-content resource the caller is free to interact with the multimedia content, e.g. inquire for more information or acquire the product/service.

In this scenario, after the call has terminated, the caller can generate a SIP Subscribe message to obtain an MMRB log (possibly the log for this particular call/subscriber) from the MMRB for VC system. The application business logic module which contains or controls the log information may create a SIP Notify message and may send the requested log to the caller. If the information from the system relates to more than one multimedia-content resource, the caller may select the resource of inquiry, and starts an Invite session with the MMRB for VC system, according to information from the Notify message. This may facilitate establishment of a session between the caller and a multimedia distributor for providing the caller with the selected multimedia-content resource. The interaction with the multimedia-content resource may take place during this session.

Further exemplary embodiments of the invention relate to the termination of the multimedia session and the playback of the multimedia-content resource. Normally an advertisement's (as an example of multimedia) play duration is well defined and predictable such as in TV commercials, for example. In the case of MMRB, the actual advertisement play duration is inconsistent and not fully defined because it may be dependant on the timing that the callee answers the call. When the callee answers the call the network normally connects the caller and the callee and the call starts. In such an event the advertisement (as MMRB) play should be terminated. If the call is responded to within a relatively short time, the advertisement may terminate before the end of the clip. This situation may reflect the advertisement's effectiveness and appeal and may limit a positive impact on the caller.

To this end, some exemplary embodiments of the invention support and implement a dynamic multimedia-content playback wherein a predefined, relatively short, multimedia segment is inserted or attached to the MMRB and is played at the end of the multimedia-session (or data-session). This dynamic multimedia-content playback may enable to reduce the adverse affects of terminating the advertisement (as MMRB) play at an unknown point in time during the multimedia-content play.

The short multimedia segment may include: a short video segment/scene, and/or audio and/or picture/graphics or any other content predefined by the administrator. The dynamic multimedia-content playback is accomplished by inserting the short ending (Video/Audio/Graphics) content segment to the media stream instead of continuation of the original advertisement (MMRB) stream. This dynamic multimedia-content and the insertion or attachment of the short predefined multimedia segment may be carried out in real time when the call connection is triggered and an advertisement (MMRB) needs to be terminated.

Another feature which may be enabled by an MMRB for VC system according to some exemplary embodiments is "in voice-call multimedia communication". The MMRB continues substantially seamlessly, and the distribution of the multimedia-content to the caller during the voice-call establishment process continues after the call is established and possibly after the caller and callee have started to talk. In this implementation the video/graphics is/are presented on the device screen during at least a portion of the call. The MMRB is finally discontinued after the call is hung up/terminated. In this manner the operator/advertiser may further increase exposure and better capture the attention and mind share of his target audience.

The MMRB for VC service can be integrated also with a mobile payment application or system. Once the caller purchases any item following an advertisement presented to the user as an MMRB for VC, the payment can be transferred from several optional sources:

I. The caller's eWallet on his phone (such as Felica)

II. His prepaid account—the payment is deducted from the caller's account balance in a similar manner to debit account.

III. Payment is charged to the caller's postpaid account in a similar manner to a credit account.

In some exemplary embodiments, the MMRB can also be integrated with LBS/GPS services. Upon this integration the operator would be able, for example, to deliver to the callers advertisements with relevancy to the caller's current location.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

The invention claimed is:

1. A method of providing multimedia ring back for a voice-call, comprising:

in response to an indication that a caller issued an invitation for a callee to join a voice-call with said caller, and wherein at least one of said caller and said callee is subscribed to a multimedia ring-back (MMRB) for voice-call (VC) service, enabling receipt by an MMRB for VC system of session establishment messages from said caller and from said callee;

in response to receipt by said MMRB for VC system of an indication that said callee has accepted said invitation and acceptance of said voice-call is pending, sending a request for adapting said caller's media specification to a media-specification that is compatible with a multimedia-content communication for an ongoing voice-call establishment process, thereby enabling said multimedia-content communication with said caller during at least a portion of said ongoing voice-call establishment process, wherein in response to said indication that said callee has accepted said invitation and acceptance of said voice-call is pending, sending a provisional media response message with said media specification that is compatible with voice communication, wherein said request for adapting said caller's media specification is triggered by an indication that said caller has acknowledged said provisional media response message, wherein said indication that said callee has accepted said invitation and acceptance of said voice-call is pending corresponds to a provisional response Ringing message; and wherein said method further comprises suspending said provisional response Ringing message from reaching said caller and instead sending said provisional media response message.

2. The method according to claim 1, further comprising in response to an indication that said callee has accepted said voice-call, sending a request for adapting said caller's media specification to a media-specification that is compatible with voice communication, thereby enabling initiation of said voice-call between said caller and said callee.

3. The method according to claim 2, wherein said indications received at said MMRB for VC system and said requests for adapting said caller's media specification correspond to respective session initiation protocol ("SIP") messages.

4. The method according to claim 3, further comprising translating SIP messages received at said MMRB for VC system to corresponding input parameters of internal methods and translating output parameters of internal methods of said MMRB for VC system to corresponding SIP messages.

5. The method according to claim 1, wherein said indication that said caller issued said invitation for said callee to join said voice-call with said caller corresponds to an Invite message with a Service Data Point that is compatible with said voice-call.

6. The method according to claim 2, wherein said request for adapting said caller's media specification to said media-specification that is compatible with said multimedia-content communication corresponds to an Update message with a Service Data Point (SDP) that is compatible with said multimedia-content communication, and said request for adapting said caller's media specification to said media-specification that is compatible with voice communication corresponds to an Update message with an SDP that is compatible with said voice-call.

7. The method according to claim 1, wherein said provisional media response message is a Session Progress message with a media specification that is compatible with said voice-call, and said indication that said caller has acknowledged said provisional media response message corresponds to a PRACK message.

8. The method according to claim 1, in response to an indication that said caller acknowledged said request for adapting said caller's media specification, further causing a multimedia distribution and control module to initiate said multimedia-content communication with said caller.

9. The method according to claim 8, further in response to said indication that said caller has accepted said voice-call, causing said multimedia distribution and service module to end said multimedia-content communication with said caller.

10. The method according to claim 8, wherein said causing said multimedia distribution and control module to initiate said multimedia-content communication with said caller comprises including at least one of data and parameters that are related to a current instance of said MMRB for VC service as part of an instruction to initiate and configure said multimedia-content communication with said caller, and communicating said instruction to said multimedia distribution and service module.

11. The method according to claim 10, wherein at least one of said data and said parameters included within said instruction are indicative of a multimedia-content resource that is related to said current instance of said MMRB for VC service.

12. The method according to claim 1, further comprising: monitoring and recording data and events related to said MMRB for VC service based on indications corresponding to SIP messages received at said MMRB for VC system during said ongoing voice-call establishment process.

13. The method according to claim 1, wherein said MMRB for VC system is registered on at least one of a Home Location Register and a Visited Location Register in association with said MMRB for VC service.

14. A system for providing multimedia ring back for a voice-call, comprising:
a processor; and
a memory that contains a computer program that controls said processor to perform operations of:
a multimedia ring-back ("MMRB") for voice-call ("VC") control module; and
a network access module operatively connected to said MMRB for VC control module and configured to interface said MMRB for VC control module with external network components,
wherein said MMRB for VC control module is configured to, responsive to an indication that a caller is inviting a callee to join a voice-call with said caller, in a voice call establishment process, determine that at least one of said caller and said callee is subscribed to an MMRB for VC service,
wherein said MMRB for VC control module is configured to:
respond to an indication that said callee received an invitation message and acceptance of said voice-call is pending, by identifying a media-specification that is compatible with a multimedia-content communication for the ongoing voice-call establishment process, and
prompt, in response, said caller to adapt its media-specification to the identified media-specification thereby enabling said multimedia-content communication with said caller during at least a portion of said ongoing voice-call establishment process,
wherein said MMRB for VC control module is configured to send, responsive to receiving an indication that said callee has accepted said invitation and acceptance of said voice-call is pending, a provisional media response message with the identified media specification that is compatible with said voice-call,
wherein said MMRB for VC control module is configured to, responsive to an indication that said caller has acknowledged said provisional media response message, prompt said caller to adapt its media-specification to said identified media-specification that is compatible with said multimedia-content communication,
wherein said indication that said callee has accepted said invitation and acceptance of said voice-call is pending corresponds to a provisional response Ringing message, and
wherein said MMRB for VC control module is configured to suspend said provisional response Ringing message and instead causes said provisional media response message to be sent.

15. The system according to claim 14, wherein said MMRB for VC control module is responsive to an indication that said callee has accepted said voice-call by sending a request for adapting said caller's media specification to a media-specification that is compatible with voice communication, thereby enabling initiation of said voice-call between said caller and said callee.

16. The system according to claim 15, wherein said network access module is a session initiation protocol ("SIP") gateway that interfaces said MMRB for VC control module with components of a communication network supporting IP Multimedia Subsystem and utilizing SIP, including with said caller and said callee.

17. The system according to claim 14, wherein said MMRB for VC control module is adapted to attach to a multimedia initiation instruction, at least one of data and parameters that are related to a current instance of said MMRB for VC service to thereby accordingly initiate and configure said multimedia-content communication with said caller.

18. The system according to claim 17, wherein said indication that said caller is inviting said callee to join said voice-call with said caller corresponds to an Invite message with a Service Data Point that is compatible with said voice-call.

19. The system according to claim 17, wherein said request for adapting said caller's media specification to said media-specification that is compatible with said multimedia-content communication corresponds to an Update message with a Service Data Point that is compatible with said multimedia-content communication, and said request for adapting said caller's media specification to said media-specification that is compatible with voice communication corresponds to an Update message with an SDP that is compatible with said voice-call.

20. The method system according to claim 17, wherein said provisional media response is a Session Progress message with a media specification that is compatible with said voice-call, and said indication that said caller has acknowledged said provisional media response message corresponds to a PRACK message.

21. The system according to claim 17, wherein said MMRB for VC control module is responsive to an indication that said caller acknowledged said request for adapting said media specification to said media-specification that is compatible with said multimedia-content communication for causing a multimedia distribution and control module to initiate said multimedia-content communication with said caller.

22. The system according to claim 21, wherein said MMRB for VC control module is further responsive to said indication that said caller has accepted said voice-call for causing said multimedia distribution and service module to end said multimedia-content communication with said caller.

23. The system according to claim 21, wherein said MMRB for VC module is adapted to include at least one of data and parameters that are related to a current instance of said MMRB for VC service within an instruction to initiate and configure said multimedia-content communication with said caller, and wherein said MMRB for VC module is adapted to communicate said instruction to said multimedia distribution and service module.

24. The system according to claim 21, wherein said MMRB for VC control module is adapted to include within said instruction to initiate and configure said multimedia-content communication with said caller, at least one of data and parameters that are indicative of a multimedia-content resource that is related to said current instance of said MMRB for VC service.

25. The system according to claim 15, wherein said MMRB for VC control module is adapted to monitor and record various data and events related to said MMRB for VC service based on indications corresponding to session initiation protocol messages received at said MMRB for VC system during said ongoing voice-call establishment process.

26. The system according to claim 15, wherein said MMRB for VC system is registered on at least one of a Home Location Register and a Visited Location Register in association with said MMRB for VC service.

27. A method of providing multimedia ring back for a voice-session, comprising:
receiving on a multimedia ring-back (MMRB) for voice-call (VC) system an indication that a caller issued an invitation inviting a callee to join a voice-call with said caller, wherein at least one of said caller and said callee is subscribed to an MMRB for VC service;
receiving on said MMRB for VC system an indication that said callee has accepted said invitation and acceptance of said voice-call is pending;
in response to said indication that said callee has accepted said invitation, invoking a media-specification modification sequence with said caller to modify a media-specification on said caller to a media-specification compatible with receipt of multimedia-content; and
causing a multimedia-session with said caller to be initiated during an ongoing voice-session establishment process,
wherein in response to said indication that said callee has accepted said invitation and acceptance of said voice-call is pending, sending a provisional media response message with said media specification that is compatible with voice communication,
wherein said request for adapting said caller's media specification is triggered by an indication that said caller has acknowledged said provisional media response message,
wherein said indication that said callee has accepted said invitation and acceptance of said voice-call is pending corresponds to a provisional response Ringing message; and
wherein said method further comprises suspending said provisional response Ringing message from reaching said caller and instead sending said provisional media response message.

28. The method according to claim 27, further comprising:
receiving on said MMRB for VC system an indication that said callee has accepted said voice-session; and
in response to said indication that said callee has accepted said voice-session sending said caller a request for adapting said media-specification to a media-specification that is compatible with voice communication, thereby enabling said voice-session between said caller and said callee.

29. A method of operating a communication system, comprising:
detecting an invitation message in which a caller invites a callee to join a voice-session with said caller, wherein at least one of said caller and said callee is subscribed to a multimedia ring-back ("MMRB") for voice-call ("VC") service,
in response to detection of said invitation message, adding an MMRB for VC system to a call establishment path to enable said MMRB for VC system to receive session establishment messages from said caller and from said callee;
detecting a message from said callee indicating receipt of said invitation and that said callee is pending acceptance of said voice-session;
in response to said message from said callee indicating receipt of said invitation, sending said caller a request for adapting a media specification to a media-specification that is compatible with a multimedia-content communication for an ongoing voice-session establishment process, thereby enabling said multimedia-content communication with said caller during at least a portion of said ongoing voice-session establishment process,
wherein in response to an indication that said callee has accepted said invitation and acceptance of said voice-call is pending, sending a provisional media response message with said media specification that is compatible with voice communication,
wherein said request for adapting said caller's media specification is triggered by an indication that said caller has acknowledged said provisional media response message,
wherein said indication that said callee has accepted said invitation and acceptance of said voice-call is pending corresponds to a provisional response Ringing message; and wherein said method further comprises suspending said provisional response Ringing message from reaching said caller and instead sending said provisional media response message.

30. The method according to claim 29, comprising:

detecting a message from said callee indicating acceptance of said voice-session; and in response to said message from said callee indicating acceptance of said voice-session, sending said caller a request for adapting said media-specification to a media-specification that is compatible with voice communication, thereby enabling said voice-session between said caller and said callee.

\* \* \* \* \*